US010008133B2

(12) United States Patent
Hong et al.

(10) Patent No.: US 10,008,133 B2
(45) Date of Patent: Jun. 26, 2018

(54) LABEL SHEET ASSEMBLY AND METHOD OF MAKING THE SAME

(71) Applicant: CCL Label, Inc., Framingham, MA (US)

(72) Inventors: Le H. Hong, Temple City, CA (US); Michael Novak, Granby, MA (US); Jerry Hodsdon, Centerville, MA (US); Gildardo Ramirez Villegas, Tijuana (MX); Alejandro Gerardo Veyna Hernandez, Tijuana (MX); Florence M. Brisee, Waterford, NY (US); Ronald Ugolick, San Dimas, CA (US)

(73) Assignee: CCL LABEL, INC., Framingham, MA (US)

( * ) Notice: Subject to any disclaimer, the term of this patent is extended or adjusted under 35 U.S.C. 154(b) by 0 days. days.

(21) Appl. No.: 14/880,896

(22) Filed: Oct. 12, 2015

(65) Prior Publication Data
US 2016/0035254 A1    Feb. 4, 2016

Related U.S. Application Data

(63) Continuation-in-part of application No. 12/617,710, filed on Nov. 12, 2009, now Pat. No. 9,159,250, (Continued)

(51) Int. Cl.
*B42D 15/00* (2006.01)
*B42F 21/00* (2006.01)
(Continued)

(52) U.S. Cl.
CPC .................. *G09F 3/02* (2013.01); *B32B 7/06* (2013.01); *B32B 7/12* (2013.01); *B32B 37/12* (2013.01);
(Continued)

(58) Field of Classification Search
CPC ......... B42F 21/00; B65D 27/00; G09F 23/10; B42D 1/00; B42D 15/00; B42D 15/10; G09C 3/00
(Continued)

(56) References Cited

U.S. PATENT DOCUMENTS

| 5,489,456 A * | 2/1996 | Instance | G09F 3/0289 |
| | | | 428/41.8 |
| 5,947,525 A * | 9/1999 | Pollman | B42F 21/00 |
| | | | 281/38 |
| 2004/0166286 A1* | 8/2004 | Auchter | G09F 3/10 |
| | | | 428/136 |

FOREIGN PATENT DOCUMENTS

WO    2011059987 A1    5/2011

OTHER PUBLICATIONS

Patent Cooperation Treaty (PCT), International Search Report and Written Opinion for Application PCT/US2016/056321 filed Oct. 11, 2016, dated Jan. 2, 2017, European Patent Office, Netherlands.

* cited by examiner

*Primary Examiner* — Justin V Lewis
(74) *Attorney, Agent, or Firm* — McDonald Hopkins LLC

(57) ABSTRACT

A label sheet assembly including a liner sheet, a carrier sheet, and a facestock sheet. The facestock sheet includes cut lines defining labels and cut lines defining at least a portion of a carrier strip. The carrier sheet can include cut lines defining at least a portion of the carrier strip. The carrier strip can be removed from the label sheet assembly to expose at least a portion of a layer of pressure sensitive adhesive on the labels. The label sheet assembly has a uniform thickness in an area that includes the carrier strip and the labels.

22 Claims, 38 Drawing Sheets

Related U.S. Application Data which is a continuation-in-part of application No. 11/590,409, filed on Oct. 31, 2006, now Pat. No. 7,934,751.

(60) Provisional application No. 60/799,238, filed on May 9, 2006.

(51) Int. Cl.
*B42D 15/10* (2006.01)
*B65D 27/00* (2006.01)
*G09F 23/10* (2006.01)
*B42D 1/00* (2006.01)
*G09F 3/02* (2006.01)
*B32B 7/12* (2006.01)
*B32B 7/06* (2006.01)
*B32B 37/12* (2006.01)
*B42F 21/02* (2006.01)
*B42F 21/04* (2006.01)
*G09F 3/10* (2006.01)

(52) U.S. Cl.
CPC ............... *B42F 21/00* (2013.01); *B42F 21/02* (2013.01); *B42F 21/045* (2013.01); *G09F 3/10* (2013.01); *B32B 2307/748* (2013.01); *B32B 2519/00* (2013.01); *B42P 2221/04* (2013.01); *G09F 2003/023* (2013.01); *G09F 2003/0226* (2013.01); *G09F 2003/0257* (2013.01); *Y10T 156/1082* (2015.01)

(58) Field of Classification Search
USPC ............ 40/359, 360, 641; 281/2, 3.1; 283/36–43, 72, 74, 81, 101
See application file for complete search history.

LABEL SHEET ASSEMBLY AND METHOD OF MAKING THE SAME

CROSS-REFERENCES TO RELATED APPLICATIONS

This application is a continuation-in-part of U.S. patent application Ser. No. 12/617,710, filed Nov. 12, 2009 which is a continuation-in-part of U.S. patent application Ser. No. 11/590,409, (U.S. Pat. No. 7,934,751) filed Oct. 31, 2006, which claims the benefit of U.S. Provisional Application No. 60/799,238, filed May 9, 2006. Each of which are incorporated by reference in their entirety.

TECHNICAL FIELD

The present invention generally relates to labels and, more particularly, relates to an improved label sheet assembly and a method of making the improved label sheet assembly.

BACKGROUND

Various systems for indexing documents utilizing dividers and labels are available. In a typical system, documents are separated by divider sheets to aid with identification of the documents. The dividers often include tabs having indicia thereon for helping a user to locate and organize documents.

While such systems may have been satisfactory for helping to index groups of documents, the task of applying identifying indicia or identifying labels to the divider tabs is time consuming, clumsy and subject to error. In many systems, tab attachable labels have been employed to help overcome such difficulties. Typically, during application the individual labels are separated from one another and then attached individually to corresponding ones of the divider tabs. In the course of individually applying the labels, they are often not applied evenly, or properly aligned with the divider sheet tabs. Even though the use of this type of attachable labels may have permitted the divider tabs to have identifying indicia, such labels have not been convenient to use.

Previous patents have taught various remedies for overcoming these shortcomings when applying tabs to index dividers. One previous example includes the use of precut labels attached to carrier strips that are in turn secured to a backing sheet. The precut labels are spaced apart on the carrier strips to align substantially on the tabs on the divider sheets. The user can separate a carrier strip and precut labels affixed thereto from the backing sheet, place and align the carrier strip across the divider sheet such that the precut labels are placed on the tabs of the divider sheets. The carrier sheet is then pulled upwardly and away from the divider sheet such that the precut labels separate from the carrier strip and remain on the divider's tabs. This system, while an improvement in certain respects over the prior art, has the disadvantage that the strips are typically flimsy and difficult to properly align. Additionally, the carrier strip can be sticky and thus may stick to unwanted surfaces.

Another remedy for the shortcomings faced when applying tabs to index dividers includes the use of a facestock adhered with releasable adhesive to a liner sheet. Die cut lines are made through the facestock to define labels to be aligned with either one or more sets of dividers or sets of file folders. Different pattern die cut lines are made through the liner sheet so that a strip can be removed directly from behind the labels, exposing the adhesive side of the labels. The labels are temporarily held onto the remainder of the facestock by small ties. After alignment and adhesion to the dividers, the facestock is then pulled upwardly and away from the divider sheet. This movement breaks the ties, leaving just the labels on the substrate. This system while a further improvement requires the use of ties to maintain the labels during alignment of the labels with the dividers. The ties may prove to be a disadvantage in that they may leave rough edges about the perimeter of the label where the ties have been broken during removal of the label sheet.

Another shortcoming of previous patents is that after removal of the strip and application of the labels onto the substrate, the sheet is no longer printable. In one instance the sheet is an irregular size after the strip is removed. Irregular sheets may have difficulty passing through printers or copiers. In another instance, after the labels have been applied to the substrate, the sheet has holes where the labels were. The holes may impart unwanted flexibility in the sheet or may provide catch points causing difficulty in passing through a printer or copier. Further removal of the labels and liner exposes adhesive on the remainder of the sheet, which may cause the sheet to adhere to the feed mechanism in a printer or copier. Thus, since printing after label removal may be problematic; all the labels should be printed in a single printing step. Any unprinted labels could not be printed in a second pass through the printer or copier and would have to be used unprinted or wasted.

Therefore it would be highly desirable to have a new and improved label sheet assembly and method of making the label sheet assembly to facilitate the application of tab labels in a fast, efficient, and accurately aligned manner. Such a new and improved label sheet assembly and method should enable a user to apply all of the divider tab labels substantially simultaneously. Furthermore, other desirable features and characteristics of the present invention will become apparent from the subsequent detailed description and the appended claims, taken in conjunction with the accompanying drawings and the foregoing technical field and background.

BRIEF SUMMARY

In an embodiment disclosed herein, a label sheet assembly includes a carrier sheet, a facestock sheet, and a liner sheet. The carrier sheet has first and second sides. The facestock sheet is releasably coupled to the first side of the carrier sheet with a layer of pressure sensitive adhesive. The liner sheet is releasably coupled to the second side of the carrier sheet with a layer of adhesive. Cut lines in the facestock sheet define a set of labels. Cut lines in the facestock sheet define at least a portion of a carrier strip. The carrier strip includes a portion of the carrier sheet and a portion of the facestock sheet. The carrier strip and the labels are configured to be removed from the label sheet assembly with the labels attached to the carrier strip. The labels are configured to detach from the removed carrier strip when applied to a substrate. The label sheet assembly is configured to have a uniform thickness in the area including the carrier strip and the labels before removal of the carrier strip and labels.

In another embodiment disclosed herein, a method for making a label sheet assembly includes the steps of providing facestock sheet material, carrier sheet material, and liner sheet material, coupling the facestock sheet material to the first side of the liner carrier sheet material with a pressure sensitive adhesive, coupling the liner sheet material to the second side of the carrier sheet material with an adhesive, cutting lines in the facestock sheet material to define a set of labels, and cutting lines in the facestock sheet material to define at least a portion of a carrier strip. The carrier strip includes a portion of the carrier sheet material and a portion of the facestock sheet material. The carrier strip and the labels are configured to be removed from the label sheet assembly with the labels attached to the carrier strip. The labels are configured to detach from the removed carrier strip when applied to a substrate. The label sheet assembly is configured to have a uniform thickness in the area including the carrier strip and the labels before removal of the carrier strip and labels.

Other independent features and advantages of the improved label sheet assembly and method will become apparent from the following detailed description, taken in conjunction with the accompanying drawings which illustrate, by way of example, the principles of the invention.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following description, a label facestock is a sheet that may be formed from various materials, and more particular a printable sheet material, such as a paper or film, in which the individual labels are formed that will readily adhere to index divider surfaces. The label facestock may be multilayered and may comprise laminated sheets. Further, the label facestock may also include various coatings to impart surface characteristics such as ink or toner receptivity, gloss, color, etc. A multilayered laminated label sheet assembly at least initially includes at least two components: the label facestock and a carrier sheet. In addition, a liner sheet may be included in the assembly. An adhesive is positioned between the label facestock and a silicone release layer formed on an uppermost surface of the carrier sheet. There is also included a second silicone release layer between the carrier sheet and the liner when included. Each of the subsequently-described label sheet assemblies may additionally include a leader portion uniquely combined with a portion of the label facestock to form a multilayered laminated label sheet assembly capable of being fed through a copier or printer, such as a laser jet printer, ink jet printer, or the like. As will become apparent from the following detailed descriptions, the embodiments herein allow the user to remove the entire line or row of labels for simultaneously application to a line of stacked, staggered index divider tabs in a manner that is an improvement over the prior art. In other embodiments, partial rows or individual labels may be removed.

Each of the cut lines described herein will typically penetrate only one of the carrier sheet or the label facestock sheet. The cut portions of the label facestock are maintained on the sheet assembly by an adhesive so that they will not separate from the sheet assembly while being passed through a printer or copier.

Figure 1:
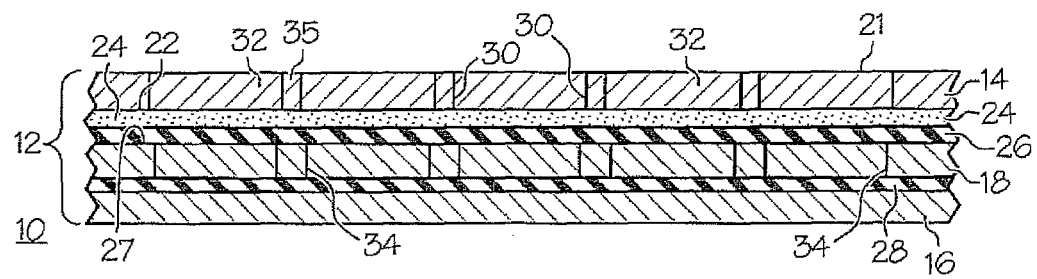
FIG. 1 is an enlarged cross-sectional view of a label sheet assembly taken along line 1-1 of FIG. 3 according to an embodiment of the present invention.
Figure 2:
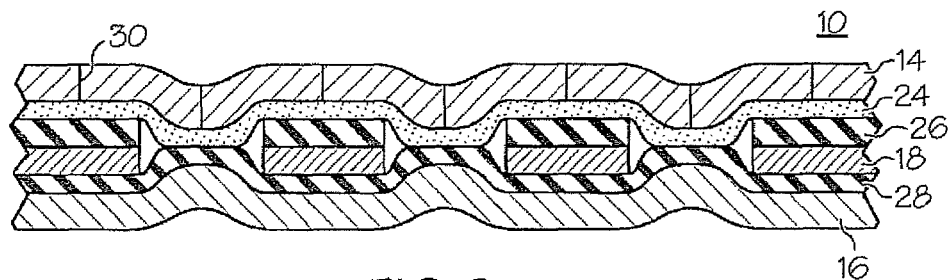
FIG. 2 is an enlarged cross-sectional view of a label sheet assembly taken along line 2-2 of FIG. 3 according to an embodiment of the present invention.
Figure 3:
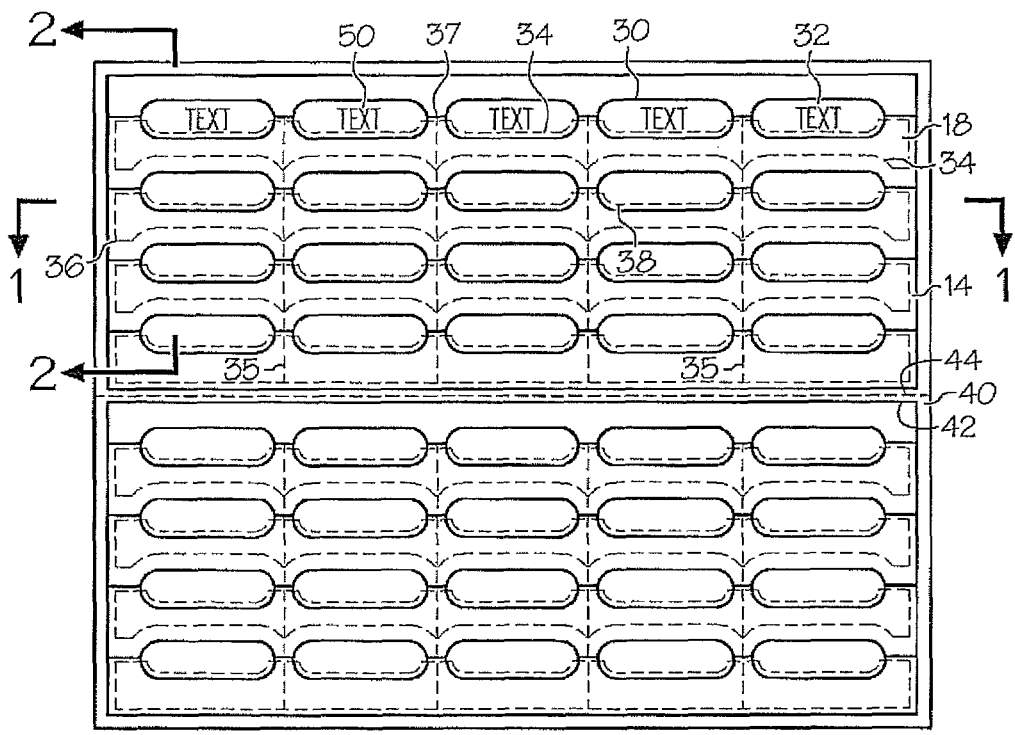
FIG. 3 is a front view of the label sheet assembly of FIGS. 1 and 2.
Figure 4:
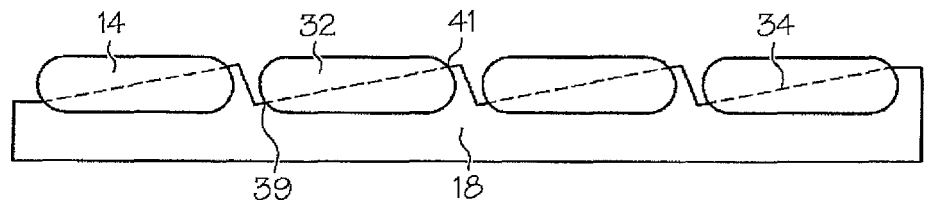
FIG. 4 is an enlarged view of a portion of a carrier strip according to another embodiment of the present invention.
Figure 5:
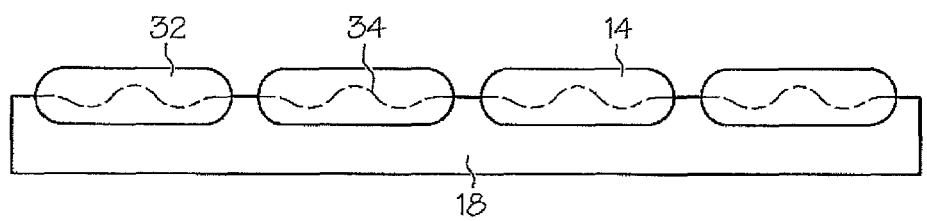
FIG. 5 is an enlarged view of a portion of a carrier strip according to another embodiment of the present invention.
Figure 6:
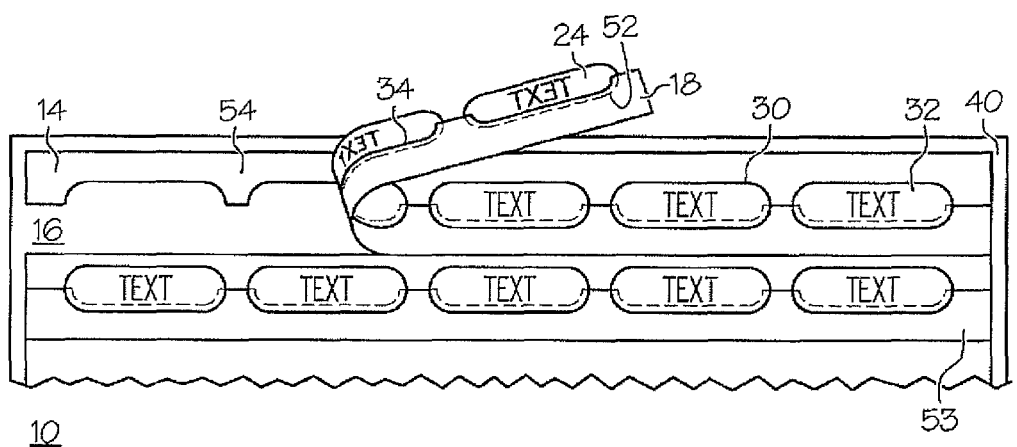
FIG. 6 is a perspective view showing of a first application step by a user of a label assembly of FIG. 1.
Figure 7:
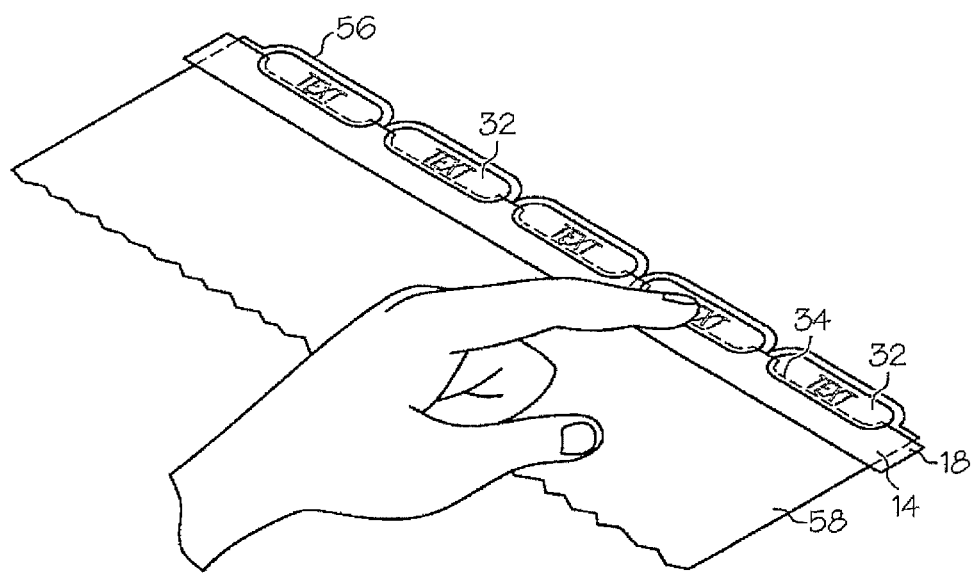
FIG. 7 is a perspective view of a second application step.
Figure 8:
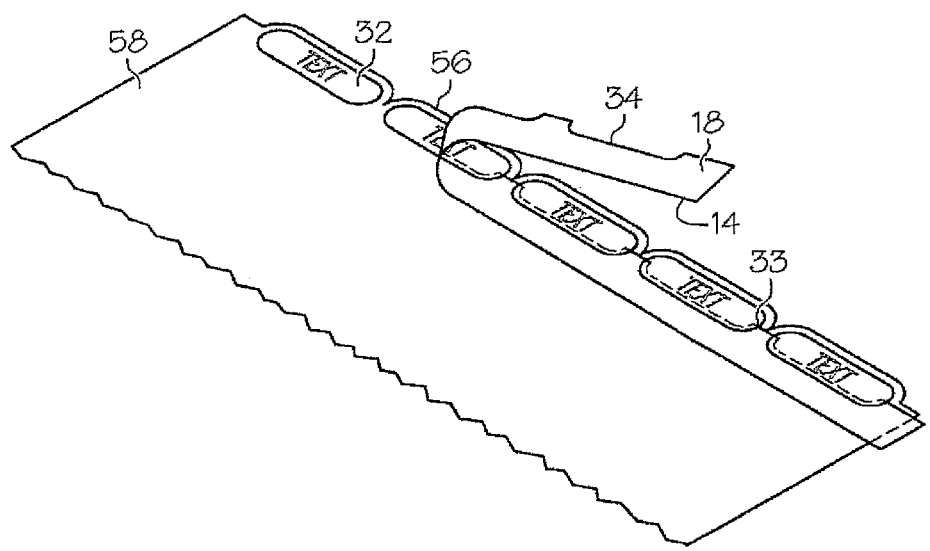
FIG. 8 is a perspective view of a third application step.

FIGS. 1-8 depict an embodiment of a label sheet assembly according to the present invention, showing die cut configurations for index divider labels. More specifically, referring to FIGS. 1-3, illustrated are cross-section views and a front view of the label sheet assembly according to the present invention. FIGS. 4 and 5 illustrate alternative carrier strip geometries and FIGS. 6-8 illustrate steps in the method of applying the labels to index dividers according to the present invention. Referring now to FIGS. 1 and 2, illustrated is a portion of a label sheet assembly 10 comprised of multiple layers 12. FIG. 1 illustrates a sectional view taken through line 1-1 of FIG. 3, and FIG. 2 illustrates a sectional view taken along 2-2 of FIG. 3. As depicted in FIGS. 1 and 2, the label sheet assembly 10 includes a label facestock 14, a liner 16, and a carrier strip 18 sandwiched therebetween. The label facestock 14 is defined by a first side 21 and an opposed second side 22. In this particular embodiment, label facestock 14 has an ink or laser receptive printable surface on first side 21. There is formed between the carrier strip 18 and the label facestock 14, an adhesive layer 24 positioned on the second side 22 of the label facestock 14. Adhesive layer 24 releasably adheres the label facestock 14 to the carrier sheet 18. A silicon release layer 26 is optionally included on a carrier strip upper surface 27 between the carrier strip 18 and the facestock 14. It should be understood that the silicon release layer 26 is optional in an embodiment including a removable or ultraremovable adhesive as the adhesive layer 24. In addition, a silicone release layer 28 is sandwiched between the carrier strip 18 and the liner 16.

Referring now to FIG. 3, the label facestock 14 includes a plurality of cuts 30 that extend through the label facestock 14 (as best seen in FIGS. 1 and 2) and define a perimeter of one or more labels 32, or portions of labels. In this particular embodiment the label facestock sheet 14 is cut by the cut lines 30 into five columns of four rows of labels. The plurality of cuts 30 are preferably formed using a rotary die cutter or cutters that are capable of cutting and scoring soft to semi-rigid material by forcing it between the blades on a cylindrical die and a hard cylindrical anvil, but in the alternative can be formed by a slicing process, such as done with a sign cutter. In a preferred embodiment, the cut lines 30 are continuous die cut. In an alternate embodiment, the cut lines 30 may comprise die cuts in the areas forming the labels 32 and may comprise other weakened lines, such as perforations, in areas not forming the labels 32.

In the embodiment illustrated in FIGS. 1-3, included is a plurality of labels 32 for placement on a plurality of staggered tabs of a set of index dividers. It should be understood that while a specific configuration of the labels 32 is depicted, any one of numerous label configurations is anticipated by this disclosure dependent upon end use. Accordingly, different numbers of columns and rows or different patterns (non-matrix) of the labels can be formed as needed. In addition, as illustrated in FIG. 3, the carrier strip 18 includes a plurality of edges 34 and may further include additional weakened lines 35 that allow the sheet assembly 10 to separate into two or more smaller strips. The weakened lines 35 are formed through both the label facestock 14 and the carrier strips 18 to allow for separation. The smaller strips allow the user to select and remove a subset of the labels 32.

Referring again to FIG. 3, a portion of the plurality of edges 34 extends from an outermost region 36 of assembly 10 a distance, and then extend down, across and up, parallel to a portion of an outer shape or perimeter of an adjacent label 32 but spaced inwardly a slight distance therefrom and extending out to form a small plateau 37 between adjacent labels 32 similar to the spacing on the label facestock 14 between the adjacent labels 32. It should be appreciated that during the fabrication of sheet assembly 10, the carrier strips 18 may be formed to extend completely across the sheet assembly 10 or in the alternative do not extend completely across the sheet assembly 10. A portion of the carrier strip edge 34 as stated is spaced inwardly a slight distance from a portion of the perimeter of the labels 32. This allows a portion of the carrier strip 18 to overlap the die cuts 30 formed in the label facestock 14 and defining labels 32. This overlap area 38 is preferably less than approximately 20% of the area of label 32. Although, an overlap that exceeds approximately 20% of the area of label 32 could be implemented. It will be appreciated that this amount of overlap could make it difficult to remove the carrier strip 18 after the labels 32 have been applied to the tabs of the index dividers (discussed presently). Moreover, the overlap 38 will vary depending, for example, on the type of adhesive that may be used. For example, adhesives ranging from permanent to ultraremovable may be used for adhesive layer 24. For embodiments in which an aggressive, permanent adhesive is used for adhesive layer 24, the minimum overlap area 38 will be relatively small, as compared to embodiments in which a removable adhesive is used. Thus, while the specific amount of overlap 38 may vary, it will be appreciated that the overlap 38 should be sufficiently large to hold the labels 32 during handling, but sufficiently small to allow clean removal of the carrier strip 18 from the label 32 after application (described presently).

Referring now to FIGS. 4 and 5, illustrated are top views of a portion of the carrier strip 18 having been removed from the liner 16 in which alternative overlap geometries are illustrated. More specifically, illustrated in FIG. 4 is an embodiment in which the carrier strip edge 34 substantially evenly divides label 32 and extends generally from a first corner 39 to a second opposed corner 41. FIG. 5 illustrates an embodiment in which the carrier strip edge 34 is formed having a waved or bumped geometry. In both alternative embodiments illustrated, the carrier strip edge 34 does not follow the general shape of the label 32 as previously described with regard to FIG. 3, yet allows sufficient overlap between the carrier strip 18 and the facestock 14, and more particularly label 32, to: (i) hold the labels 32 during handling, (ii) allow for clean removal of the carrier strip 18 after application, (iii) facilitate the adhering of the label 32 to the surface of the dividers, etc., and (iv) provide for efficient manufacturability.

Referring again to FIG. 3, both the carrier strip 18 and the label facestock 14 preferably have additional cut lines. As can be understood from FIG. 3, portions of the label facestock 14 have been cut and stripped away to form the edge margins 40 of the sheet assembly 10. In addition, any portion of the carrier strip 18 formed in this area has also been stripped away. These margins 40 are provided to optimize printer and copier performance of the label sheet assembly 10. Additionally, an optional gutter strip 42 has been cut and removed from the center and a perforation line 44 formed down the center of the label facestock 14. This allows the construction to be divided into two parts by the user. It should be appreciated that other forms of weakened lines may be used in place of the perforation line 44 to divide the sheet assembly 10. Two smaller label applicator construction sheet assemblies are thereby formed for passing through a printer or as may be desired by the user.

After passing through a printer or copier, and with desired indicia 50 printed on the labels 32, the labels 32 are ready to be adhered to the tabs of an index divider, folder, or the like. Referring now to FIGS. 6-8, illustrated are perspective views of a top portion of the label sheet assembly 10 according to FIGS. 1-3, showing a plurality of steps for applying a first series of printed labels 32. As illustrated in FIG. 6, initially the carrier strip 18, including a portion 52 of the label facestock 14 of the sheet assembly 10 is pulled away and separated from a remainder portion 54 of the sheet assembly 10. It should be appreciated that although illustrated as being pulled from a specific direction relative to the edges of the sheet assembly 10, the carrier strip 18 may be formed to be pulled from either direction adjacent an edge of the sheet assembly 10, or both. During this step, the labels 32 are removed from the full liner sheet 16 when the user detaches the carrier strip 18 from the full liner sheet 16, exposing the adhesive side 24 of the labels 32. At this point a portion of each label 32 overlaps with the carrier strip 18 and is adhesively held onto the carrier strip 18 by the adhesive connection between the label facestock 14 and the carrier strip 18. This overlap of the labels 32 with the carrier strip 18 negates the need for other means of tying the labels 32 together at this stage. It should be noted that the carrier strip edges 34 follow both the horizontal and vertical cuts 30 of the label 32, thereby providing support on at least a portion of three sides of the label 32. As a result, the carrier strip 18 provides a strong, not flexible or flimsy, means for manipulating and accurately positioning a row of exposed labels 32 onto the desired positions of a plurality of staggered tabs 56 of a plurality of index dividers 58 as shown in FIGS. 7 and 8.

Holding the carrier strip 18 with the labels 32 having their adhesive sides exposed, the user then aligns the labels 32 with the tabs 56 of the index dividers 58. Each of the properly positioned labels 32 is then pressed flat down to form a strong adhesive bond onto the respective tabs 56 as depicted in FIG. 7. The carrier strip 18 to which the labels 32 are less strongly adhesively attached is then pulled away from the adhered labels 32, leaving just the labels 32 on the tabs 56 as illustrated in FIG. 8. In that the carrier strip 18 has been removed from the liner 16 having the labels adhesively attached thereto, the liner 16 remains the original size and is described as multipassable. To prepare more labels 32 for new tabs if additional labels were not previously printed, the user simply reruns the multipassable label sheet assembly 10 through the printer, printing on the subsequent array of labels to produce aligned, printed tab labels. It should be understood that the user can print as many labels as needed during a single printing process. Referring back to FIG. 6, after printing, a next carrier strip 53 may be removed from the liner sheet 16 to expose the backsides of the second line of printed labels 32. The second line of printed labels 32 is then manipulated into position on a second set of staggered dividers (not shown), the labels 32 pressed into position and the carrier strip removed. This can be understood by again viewing FIGS. 6 through 8.

As best illustrated in FIG. 8, during adherence of the labels 32 to the tabs 56, for a brief moment a portion of the carrier strip 18 is positioned between the divider tab 56 and the label 32. The user after pressing the label 32 against the divider tab 56 adheres a major portion of the label 32 to the divider tab 56 and a small edge portion 33 is attached to the carrier strip 18. The carrier strip 18 is then pulled past the labels 32 so that the label edges 33 bend or flex slightly to allow the carrier strip 18 to be removed. The label 32 exhibits sufficient tension and memory in its material to cause the edges 33 that are lifted up during removal of the carrier strip 18 to snap back onto the divider tab 56. The user may then smooth the edges to ensure complete adhesion.

Figure 9:
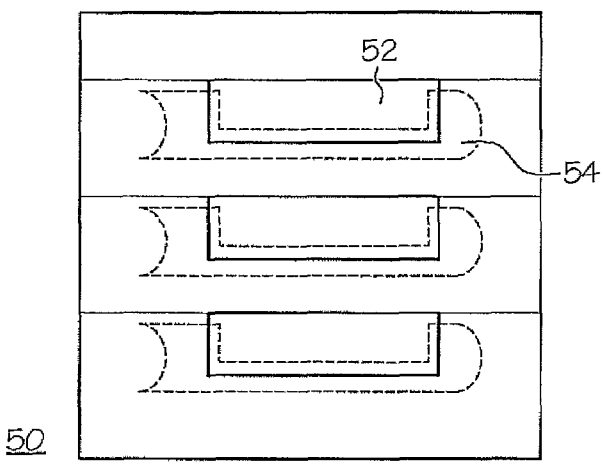
FIG. 9 is a front view of a label sheet assembly according to yet another embodiment of the present invention.

Referring now to FIG. 9, illustrated is an embodiment of a sheet assembly 50 formed in generally the same manner as the sheet assembly 10 described in FIGS. 1-3. In this particular embodiment, a single label 52 is formed on a carrier strip 54 to allow for removal and positioning of a single label 52. Each label 52 may be printed and peeled away from a liner for individual placement. It should be understood that the label 52 size and placement can vary depending upon the specific application for the label 52.

Figure 10:
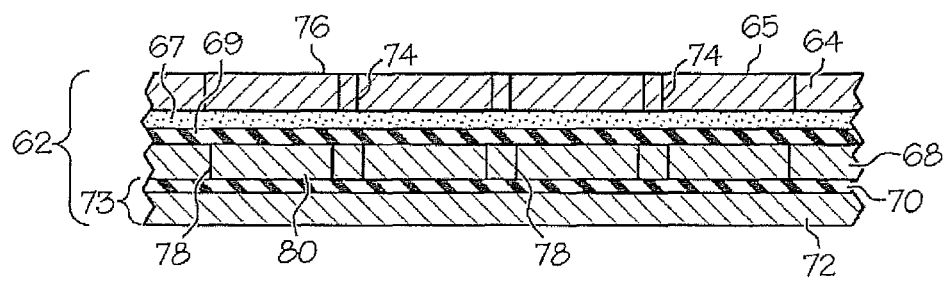
FIG. 10 is an enlarged cross-sectional view of a label sheet assembly taken along line 10-10 of FIG. 11 according to another embodiment of the present invention.
Figure 11:
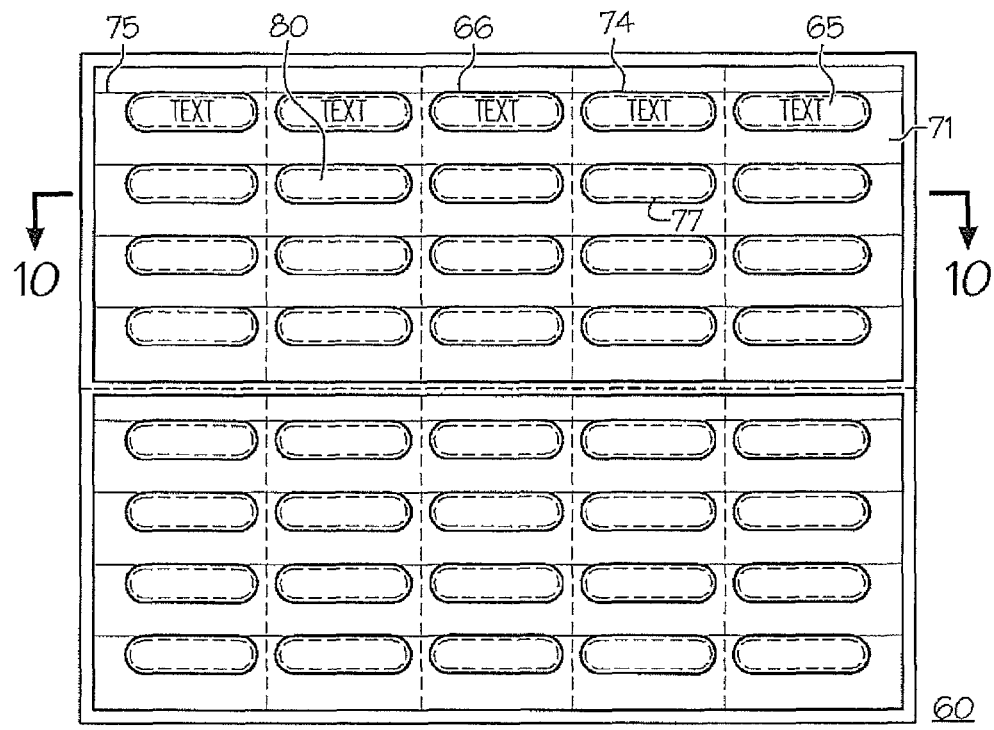
FIG. 11 is a front view of the label sheet assembly of FIG. 10.
Figure 12:
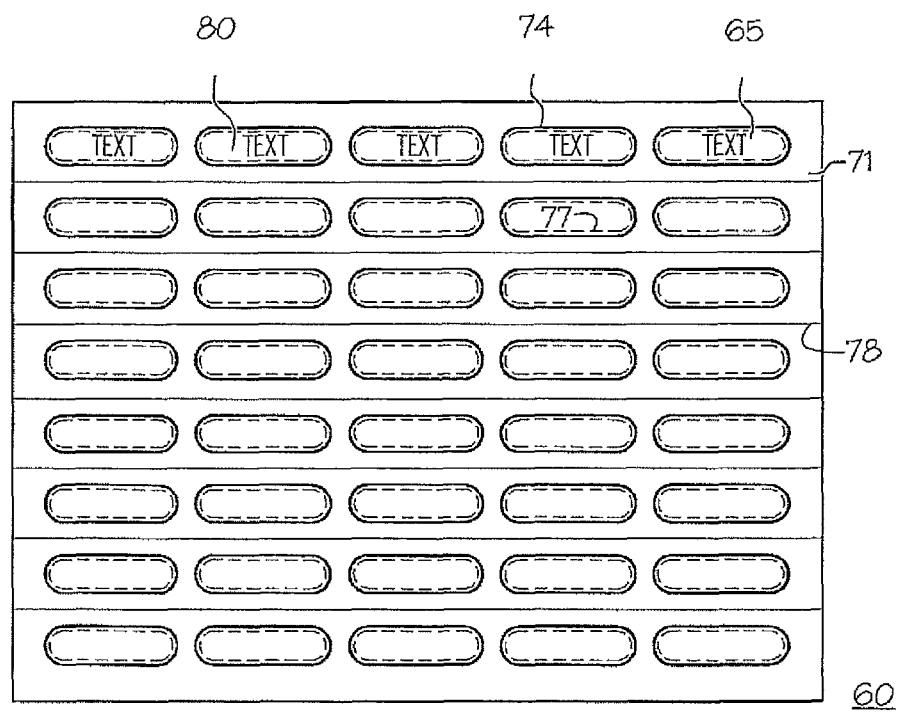
FIG. 12 is an enlarged front view of an alternate label sheet assembly according to another embodiment of the present invention.

Referring now to FIGS. 10-12, illustrated is another embodiment of a label sheet assembly 60 including a plurality of labels 65. FIG. 10 is a cross-section view taken through line 10-10 of FIG. 11. Similar to the embodiment illustrated in FIGS. 1-3, the label sheet assembly 60 is formed of multiple layers 62 that include a label facestock 64 adhered with an adhesive 67 to a carrier sheet 68. The carrier sheet may optionally include a silicone release layer 69, such as that described in FIG. 1 when adhesive 67 is not formed from an easily removable adhesive. The carrier sheet 68 is adhered with a heat activated coating 70 to a sheet 72, either a paper or a film. The heat activated coating 70 may be formed of a material such as polyolefin in a homogenous mixture or as a single component composition. In addition, heat activated coating 70 may be formed of a copolyester, ethylene vinyl acetate, ethylene vinyl alcohol, polyvinyl chloride, ionomer resins, ethylene methyl acrylate, ethylene ethyl acrylate, ethylene acrylic acid, or the like. Heat activated coating 70 and sheet 72 together form a liner sheet 73. Alternatively, the heat activated coating may be replaced with a removable adhesive, ultraremovable adhesive or pattern-coated adhesive, and thereby also not require a silicone release layer. Similar to the first embodiment, it should be understood that label facestock 64 includes a printable surface 76. The printable surface 76 may include surface treatments or coatings to enhance acceptance of indicia.

Referring more specifically to FIGS. 10 and 11, the label facestock 64 includes a plurality of cuts lines 74 that extend through the label facestock 64 and define the perimeter of one or more labels 65 or portions of labels. In this particular embodiment and similar to the first embodiment, different numbers of columns and rows or different patterns (non-matrix) of the labels or carrier strip may be formed as needed. In addition, the carrier sheet 68 includes a plurality of cuts lines 78 that extend through the carrier sheet 68 and define a plurality of cut edges 69 of at least one carrier strip 71. More specifically, as illustrated in FIG. 11, cut lines 74 that define the label 65 having an uppermost edge 66 that is straight across and in line with a cut line 78 in the carrier sheet, defining a top edge 69 of the carrier strip. The cuts lines 78 in the carrier sheet 68 further define a plurality of cut edges 73 in the carrier strip 71, wherein a small portion of the resulting carrier strip 71 covers a portion of each label 65 and a portion between the labels. This differential yields an overlap region that surrounds the perimeter of the label 65 and functions similar to the overlap region in the first embodiment, namely to lift up the array of labels 65 when the user separates the carrier strip 71 from the liner sheet 73.

Referring now to FIG. 12, illustrated is an alternate embodiment in which cut lines 74 define the label 65 in a central portion of the carrier strip. Cut lines 78 in the carrier sheet define the top edge 69 of the carrier strip 71 that forms a straight edge across the sheet assembly 60. Similar to the embodiment illustrated in FIG. 11, the cuts lines 78 in the carrier sheet 68 further define a plurality of cut edges 73 in the carrier strip 71, wherein a small portion of the resulting carrier strip 71 covers a portion of each label 65 and a portion between the labels. This differential yields an overlap region that surrounds the perimeter of the label 65 and functions similar to the overlap region in the first embodiment, namely to lift up the array of labels 65 when the user separates the carrier strip 71 from the liner sheet 73. In the embodiments illustrated in FIGS. 11 and 12, sheet assembly 60 includes the liner sheet 73, including heat activated coating 70 and sheet 72, the carrier sheet 68, and the label facestock sheet 64 to form a laminate construction that is adapted to pass through a printer or copier multiple times in that the liner sheet is not cut and remains the same size. Desired indicia are printed on the labels 65 before the carrier strip 71 is removed to a separated position.

During application of the labels 65 illustrated in FIGS. 11 and 12 to a plurality of tabs on index dividers, folders, or the like, the carrier strip 71 is detached from the liner sheet 73 in a manner similar to that previously described with regard to the first embodiment. A portion 80 of the carrier strip 71 that covers the adhesive layer 67 where the plurality of labels 65 have been defined is left behind because it is attached to the heat sealable layer 72. This defines a window area (not shown) in the carrier strip 71 and allows the adhesive on labels 65 to be exposed and, ready for application onto the aligned tabs. The user then proceeds like described with regard to FIGS. 6-8 to use the carrier strip 71 to align the array of labels 65 with the tabs of the dividers, file folders, or the like. After proper alignment, the user then applies the array of labels 65 and removes the carrier strip 71, leaving the labels 65 on the tabs. To prepare more labels 65 for new tabs, the user simply reruns the multipassable label sheet assembly 60 through the printer, printing on the subsequent array of labels to produce aligned, printed tab labels. It should be understood that the user can print as many labels as needed during a single printing process.

Figure 13:
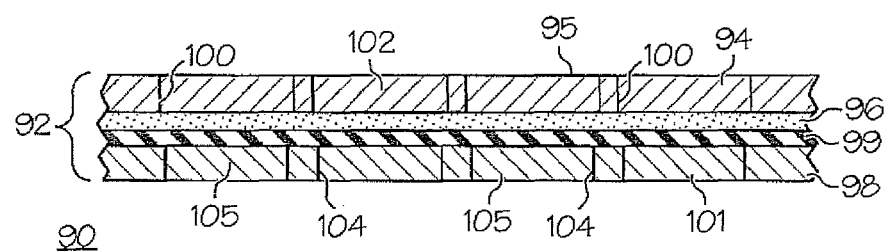
FIG. 13 is an enlarged cross-sectional view of a label sheet assembly taken along line 13-13 of FIG. 14 according to yet another embodiment of the present invention.
Figure 14:
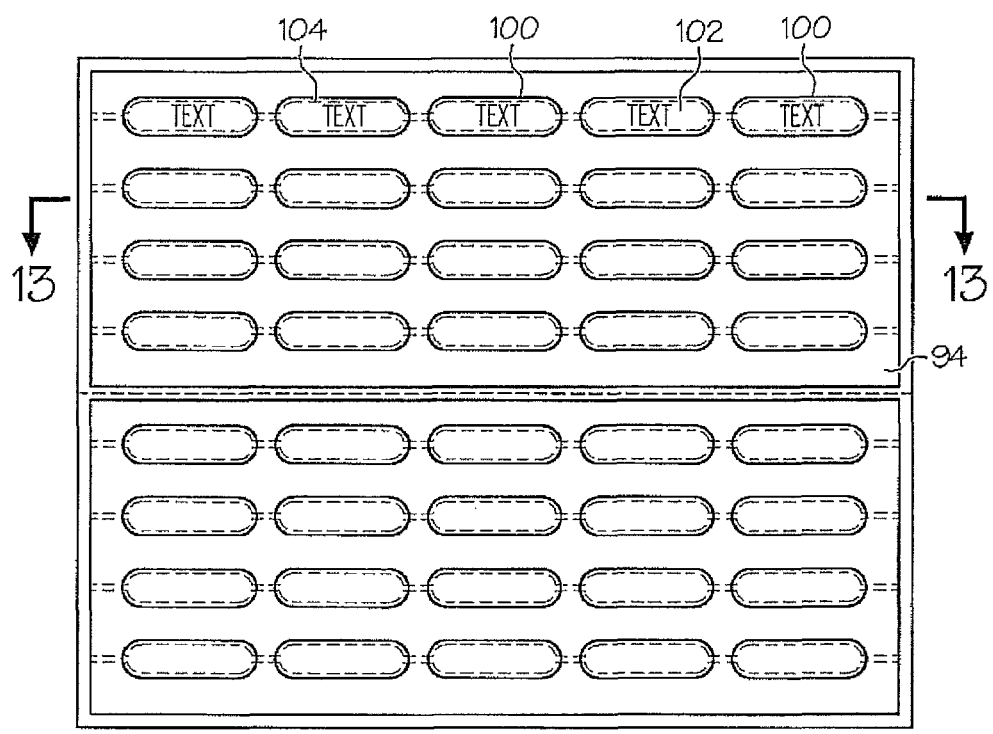
FIG. 14 is an enlarged front view of an alternate label sheet assembly according to another embodiment of the present invention.
Figure 15:
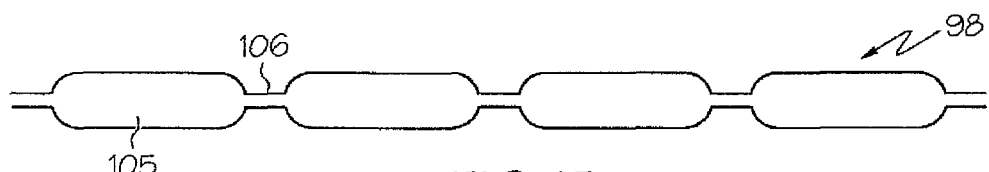
FIG. 15 is an enlarged top view of a portion of the carrier strip removed from the embodiment of FIGS. 13 and 14.

Referring now to FIGS. 13-15, illustrated are a cross-section view taken through line 13-13 of FIG. 14, a front view of the label sheet assembly, and a front view of a portion of a carrier sheet according to the present invention. Similar to the embodiment illustrated in FIGS. 1-3, the label sheet assembly 90 is formed of multiple layers 92 that include a label facestock 94 adhered with an adhesive 96 to a carrier sheet 98. It should be understood that carrier sheet 98 may optionally include a silicone release layer 99 as described in the previous embodiments. The carrier sheet 98 when cut serves a similar function as both the carrier strip and liner in the previous embodiments. Similar to the first and second embodiments, label facestock 94 includes a printable surface 95.

The label facestock 94 includes a plurality of cuts 100 that extend through the label facestock 94 and define a perimeter of one or more labels 102 or portions of labels. In this particular embodiment and similar to the first embodiment, different numbers of columns and rows or different patterns (non-matrix) of the labels can be formed as needed. The carrier sheet 98 includes a plurality of cuts 104 that extend through the carrier sheet 98 and define a plurality of edges of a carrier strip 101. As in the previous embodiments, cuts 104 are positioned slightly inward of cuts 100 about at least a portion of the label 102, so that the carrier sheet 98, and more particularly the carrier strip 101, overlaps the labels 102 about at least a portion of the perimeter, thereby defining an overlap.

During application of the labels 102 to a plurality of tabs on index dividers, folders, or the like, a first carrier strip 101 is removed from the sheet assembly 90, thereby reducing the overall sheet assembly size. A plurality of portions 105 of the carrier strip 101 are removed to expose the adhesive backing on labels 102. The portions 105 may be removed individually, or may be removed in a strip, as best illustrated in FIG. 15. Portions 105 have been cut to allow for a portion 106 of the carrier sheet 98 to remain and tie together the plurality of portions 105 upon removal to expose the adhesive backing on labels 102. The user then proceeds as described with regard to FIGS. 6-8 to use the carrier strip 101 in a similar manner as the previous embodiments of the carrier strip; to align the array of labels 102 with a plurality of tabs of dividers, file folders, or the like. After proper alignment, the user applies pressure to the array of labels 102 and removes the carrier strip 101, leaving the labels 102 on the tabs. In this particular embodiment sheet assembly 90 includes the carrier sheet 98 and the label facestock sheet 94 to form a laminate construction that is adapted to pass through a printer or copier. In that the carrier sheet 98 is cut into a plurality of carrier strips 101 and subsequently each is detached or separated from the plurality of carrier strips 101, and removed, the sheet assembly 90 is reduced in size and only passable through a printer or copier a single time. An alternate embodiment may include a gutter, similar to a previous embodiment, in which each separate half of the sheet assembly may be passed through a printer or copier a single time. Desired indicia are printed on the labels 102 before the carrier strip 101 is removed to a separated position.

Figure 16:
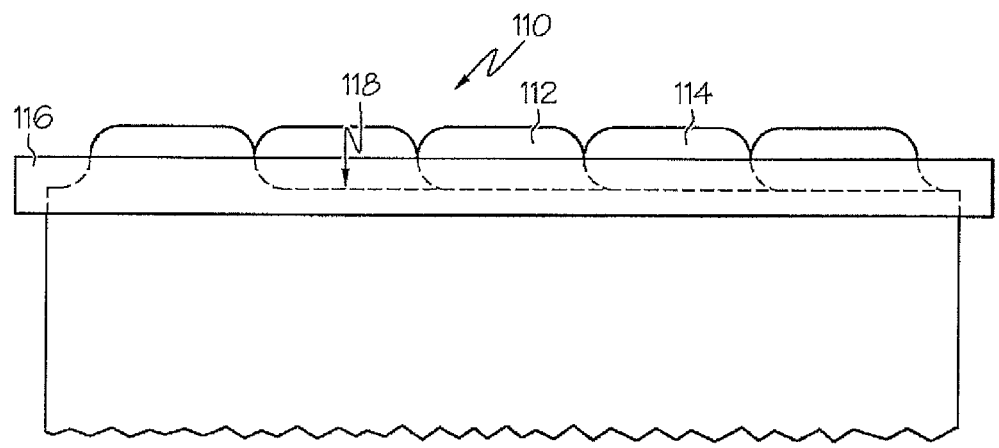
FIG. 16 is a simplified top view of an embodiment of an alignment guide for use with the label sheet assembly of the present invention.
Figure 17:
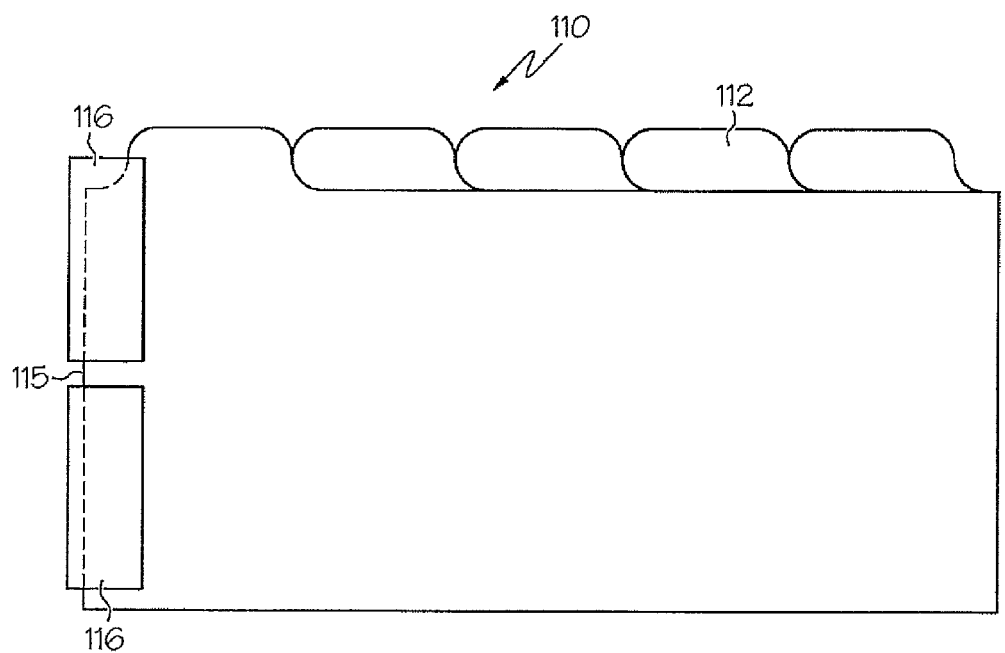
FIG. 17 is a simplified top view of another embodiment of an alignment guide for use with the label sheet assembly of the present invention.
Figure 18:
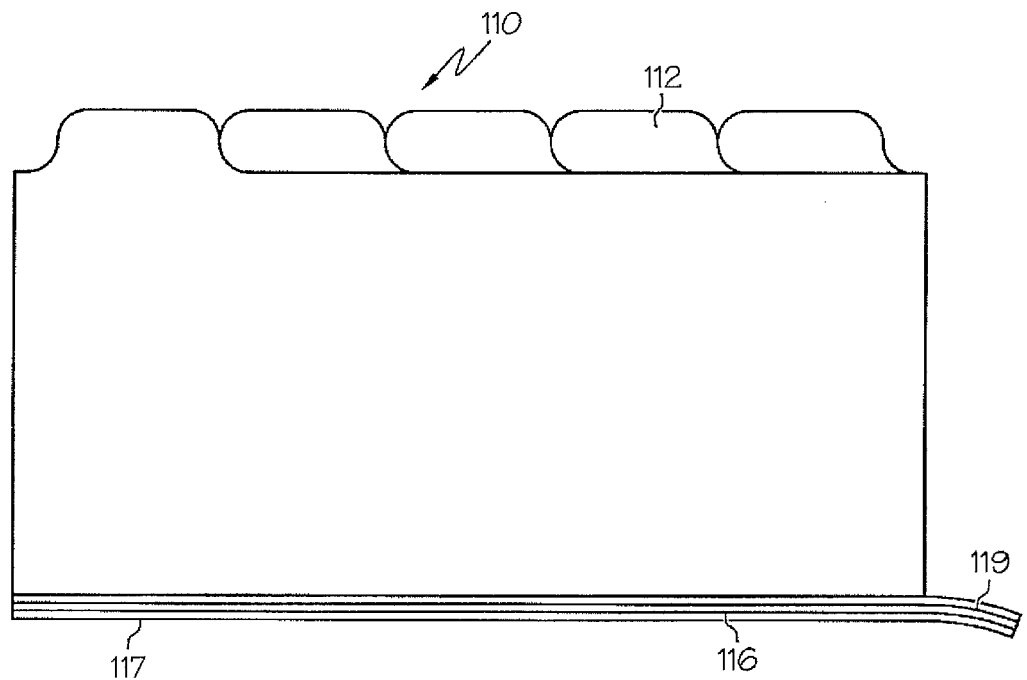
FIG. 18 is a simplified top view of another embodiment of an alignment guide for use with the label sheet assembly of the present invention.

Referring now to FIGS. 16-19, to minimize movement or shifting of a set of index dividers, file folders, or the like during the label application process, methods for temporarily aligning the set of index dividers are presented. As illustrated in FIGS. 16-19, provided is a set of index dividers 110, including a plurality of tabs 112 having a generally centralized portion 114 for placement of a label according to the present invention including identifying indicia. To provide proper alignment of the labels on tabs 112, the dividers 110 can be held in place by a single length or plurality of lengths, of removable tape 116 positioned across a lower portion 118 of the tabs 112 outside of the portion 114 where the labels will be adhered as illustrated in FIG. 16. In the alternative, a single length of a tape 116 or a plurality of lengths of tape 116 may be positioned across an edge 115, or multiple edges, of the set of index dividers 110 as best illustrated in FIG. 17 or across a binding edge 117 of the dividers 110 as best illustrated in FIG. 18. The tape 116 can be in the form of either a complete strip or a plurality of sections that are spaced apart, covering the entire length or width of the divider set 110 as illustrated. After the labels have been applied onto the tabs 112, the tape 116 is removed using an optional pull tab 119 as illustrated in FIG. 18 or by simply lifting and removing the tape 16 from the dividers 110. Alternatively, a glue or adhesive that does not leave undesired residue on the edges of the dividers 110 can be used in place of the tape 116.

Figure 19:
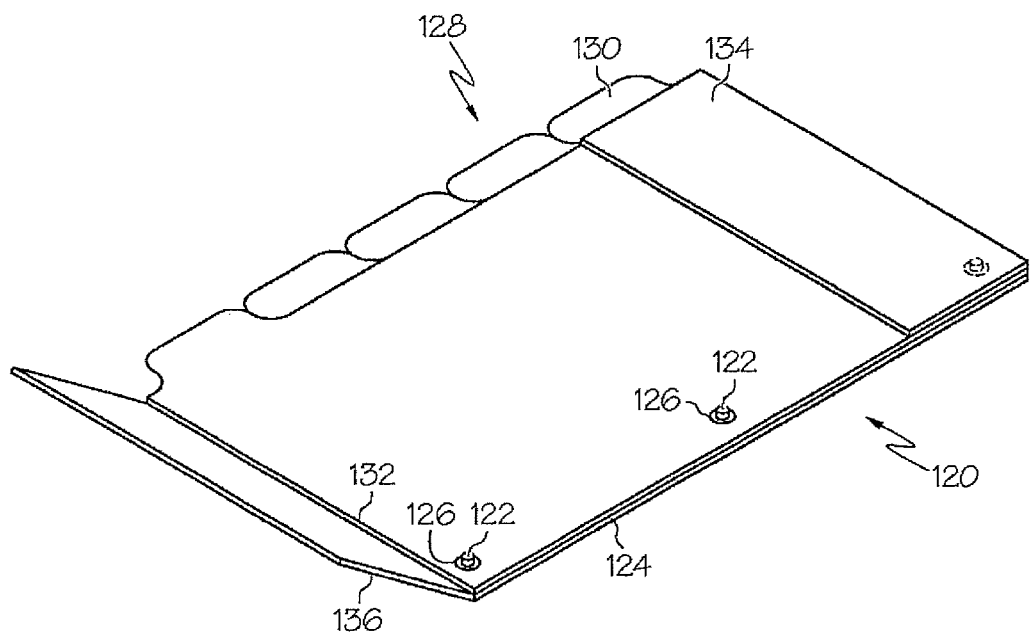
FIG. 19 is a simplified perspective view of yet another embodiment of an alignment guide for use with the label sheet assembly of the present invention.

Another method for aligning and securing sets of dividers during application of the labels according to the present invention uses an alignment guide as illustrated in FIG. 19. More specifically, provided is an alignment guide 120 comprising at least one post 122 positioned on an alignment strip 124 in a manner that would align with the rings in a typical binder in which a set of dividers 128 may be placed. In one embodiment, a series of at least two holes 126 are formed in the dividers 128 having a plurality of staggered tabs 130 to which a label is to be adhered. The at least one post 122 is smaller in dimensions than the holes 126 on the dividers 128, thereby allowing the at least one post 122 to fit through the holes 126. To position the dividers 128 for label application, a user places the dividers 128 onto the alignment guide 110, and more particularly places the at least one post 122 through the divider holes 126, making sure to align all the dividers holes 126 with at least one post 122. This ensures that the tabs 130 for each divider 128 will be aligned with the tab 130 on adjacent dividers 128 and that the set of dividers 128 will not shift during the label application process. The at least one post 122 can be manufactured using thermoforming, injection molding, profile extrusion, or other methods known to the industries. In addition, an optional flap 136 may be incorporated with the alignment strip 124 to allow for folding over, as illustrated at 134, at least one of the edges 132 of the set of dividers 128. It can be appreciated that posts, flaps, or combinations of posts and flaps can be used as an alignment means. Alternative means for aligning the set of index dividers 128 of the present invention are also anticipated herein, for example, a pouch such as that taught in U.S. Pat. No. 6,803,084, assigned to the same assignee, and incorporated herein by this reference.

Embodiments shown in FIGS. 1-6 include carrier strips separated from one another by a gap wider than the width of a separation line. Additional embodiments of the invention include using a carrier sheet cut into strips separated from one another by a separation line between them. As used in discussion of the embodiments that follow, the term laminate or laminate material refers to a laminated construction prior to the formation of any cuts therein. The term label sheet assembly refers to a laminated construction after formation of cuts therein.

Figure 20:
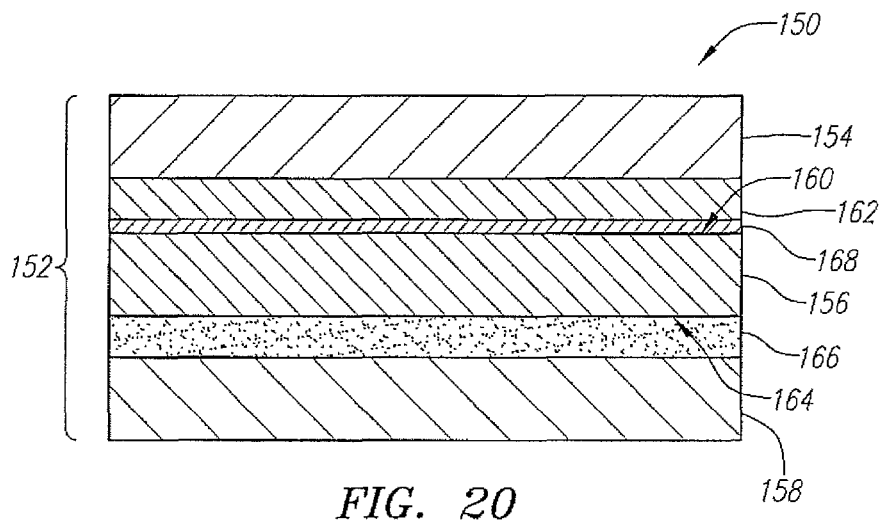
FIG. 20 is an enlarged sectional view of a laminate material according to an embodiment of the present invention.

In one embodiment 150, as shown in FIG. 20, the laminate 152 includes a facestock sheet 154, a carrier sheet 156, and a liner sheet 158. The facestock sheet is releasably attached to one side 160 of the carrier sheet with a layer of pressure sensitive adhesive 162. The liner sheet is releasably attached to the other side 164 of the carrier sheet with an adhesive 166 that can also be a pressure sensitive adhesive.

The facestock sheet 154 can be made of any material suitable for use as a pressure sensitive label. Suitable materials include, for example, films, papers, and laminates of film and paper. Polyesters, polyolefins, polyvinyl chlorides, other heat-stable films, and top-coated papers and films are non-limiting examples of materials suitable for use as label facestocks. Topcoats useful for use with facestock sheets include those known to promote ink and toner receptivity.

The liner sheet 158 can be made from, for example, super-calendered paper, polyolefin coated paper, lacquer-coated paper, varnish-coated paper, and heat-stable films. Useful super-calendered papers include those in the Felix Schoeller (Osnabrueck, Germany) Matte Coated Paper product line. Useful polyolefin-coated papers include those in the Felix Schoeller Glossy Coated Paper product line. The liner sheet can be sealed, if necessary, to prevent or reduce penetration of the adhesive 166 that adheres the carrier sheet 156, thus permitting the carrier sheet to be removed from the liner sheet. An example of a useful sealant is CRAIGCOAT 1091X (Craig Adhesives and Coatings, Newark, N.J.). Alternatively, if the liner sheet is sufficiently impermeable to the adhesive, for example, if the liner sheet is polyolefin-coated paper, no sealant is needed.

The carrier sheet 156 can be made of materials that are typically suitable for backing pressure sensitive labels. The carrier sheet can be coated with a silicone release material 168, or other material suitable as release material for pressure sensitive adhesives. Suitable carrier sheet materials include, for example, super-calendered kraft paper, glassine paper, polyesters, polyolefins, heat-stabilized polyolefins, and machine-finished coated paper.

The pressure sensitive adhesive layer 162 between the facestock sheet 154 and the carrier sheet 156 can be formed from any pressure sensitive adhesive known in the art. The pressure sensitive adhesive is chosen based upon the desired label properties, for example, a removable or ultraremovable adhesive can be used if the label is desired to be cleanly removed from the substrate to which it is attached. Alternatively, a permanent pressure sensitive adhesive can be used if the label is to permanently adhere to the substrate. Suitable pressure sensitive adhesives include those based upon acrylics, rubbers, and silicones. The pressure sensitive adhesive can be solvent-based, water- or emulsion-based, suspension-based, and hot-melt or 100% solids-based. A wide range of tackifiers known in the art can be used to modify the properties of the pressure sensitive adhesive.

The adhesive layer 166 between the carrier sheet 156 and the liner sheet 158 can be formed with a material that can be characterized as a dry-tack or fugitive adhesive. These adhesives provide a non-destructive bond between the carrier sheet and the liner sheet and result in tack-free surfaces after debonding. Dry-tack adhesives include, for example, natural rubber latex, polyvinyl acetate, emulsion acrylics, and thermoplastic elastomers. An example fugitive adhesive useful in this embodiment is NWC 2000C DRY RELEASE ADHESIVE (Ashland, Inc., Covington, Ky.). Alternatively, a removable or ultraremovable pressure sensitive adhesive can be used. When a removable or ultraremovable pressure sensitive adhesive is used, the adhesive can remain on the liner sheet after debonding of the carrier sheet from the liner sheet, resulting in the exposed carrier sheet surface being tack-free.

The thickness of the entire laminate 152 is typically from approximately 6 mils and approximately 8.1 mils, although values outside this range can be used as long as a label sheet assembly made from the laminate is capable of passing through a printer or copier. The thickness of the facestock sheet 154 is typically from approximately 1 mil and approximately 3.5 mils, the thickness of the carrier sheet 156 is typically from approximately 0.5 mil and approximately 2.6 mils, and the liner sheet 158 thickness is typically from approximately 2 mils to approximately 4 mils. The thickness of the pressure sensitive adhesive layer 162 is between the facestock sheet and the carrier sheet is typically from approximately 0.5 mil to approximately 1.5 mils, depending on the adhesive used and the physical properties desired. The adhesive layer 166 between the carrier sheet and the liner sheet is typically from approximately 0.2 mil and approximately 1 mil. The total thickness of the laminate includes the thickness of the facestock sheet, the thickness of the carrier sheet, the thickness of the liner sheet, the thickness of the layer of pressure sensitive adhesive, and the thickness of the layer of the adhesive layer.

An example of laminate material 152 useful for use in the embodiment of FIG. 20 is VERSATILE COUPON TC (Avery Dennison, Inc., Pasadena, Calif.)

Figure 21:
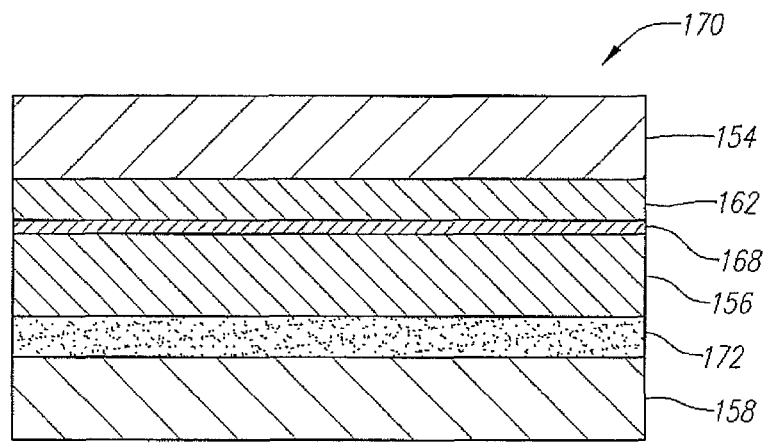
FIG. 21 is an enlarged sectional view of a laminate material according to another embodiment of the present invention.

Another embodiment 170 is shown in cross-section in FIG. 21. In this particular embodiment, the adhesive layer 166 between the carrier sheet 156 and the liner sheet 158 is replaced with a heat-seal layer 172. The heat-seal layer serves to hold the carrier sheet and the liner sheet together, much the same way as the adhesive that is being replaced. The heat seal layer includes a heat sealable material, an example of which is ethylene vinyl acetate. Other heat sealable materials include, for example, ethyl methacrylate, ethylene co-acrylic acid, low density polyethylene, high density polyethylene, SURLYN (E.I. du Pont de Nemours and Company, Wilmington, Del.), and mixtures thereof.

Figure 22:
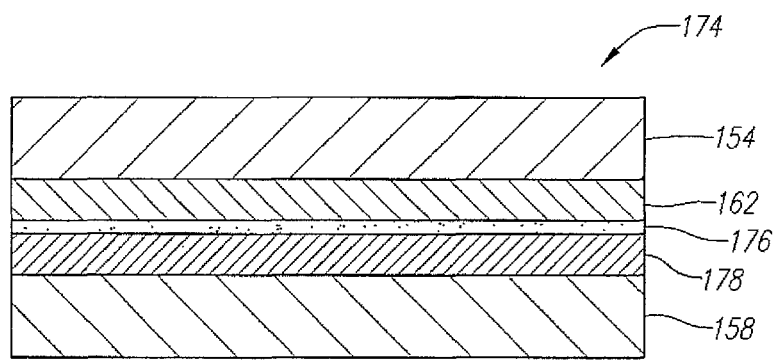
FIG. 22 is an enlarged sectional view of a laminate material according to yet another embodiment of the present invention.

Yet another embodiment 174 shown in cross-section is illustrated in FIG. 22. In this particular embodiment, the carrier sheet 156 is replaced by a non-adhesive coating 176 between the pressure sensitive adhesive layer 162 and a release layer 178 applied to the liner sheet 158. The coating is printed or pattern coated to cover areas of the pressure sensitive adhesive forming part of a carrier strip that will be described herein below, thereby rendering the pressure sensitive adhesive non-tacky. An exemplary coating includes a mixture of 8.7 parts of polyvinyl acetate having glass transition temperature greater than 25° C. (e.g., VINAC XX-210, Air Products and Chemicals, inc., Allentown, Pa.) to 1 part of polystyrene emulsion (e.g., ACRYGEN 4999, Omnova Solutions, Inc., Chester, S.C.). Other useful coatings include, for example, styrene acrylates, polyurethanes, polyacrylates, and cured water-borne epoxy resins.

Figures 52, 53:
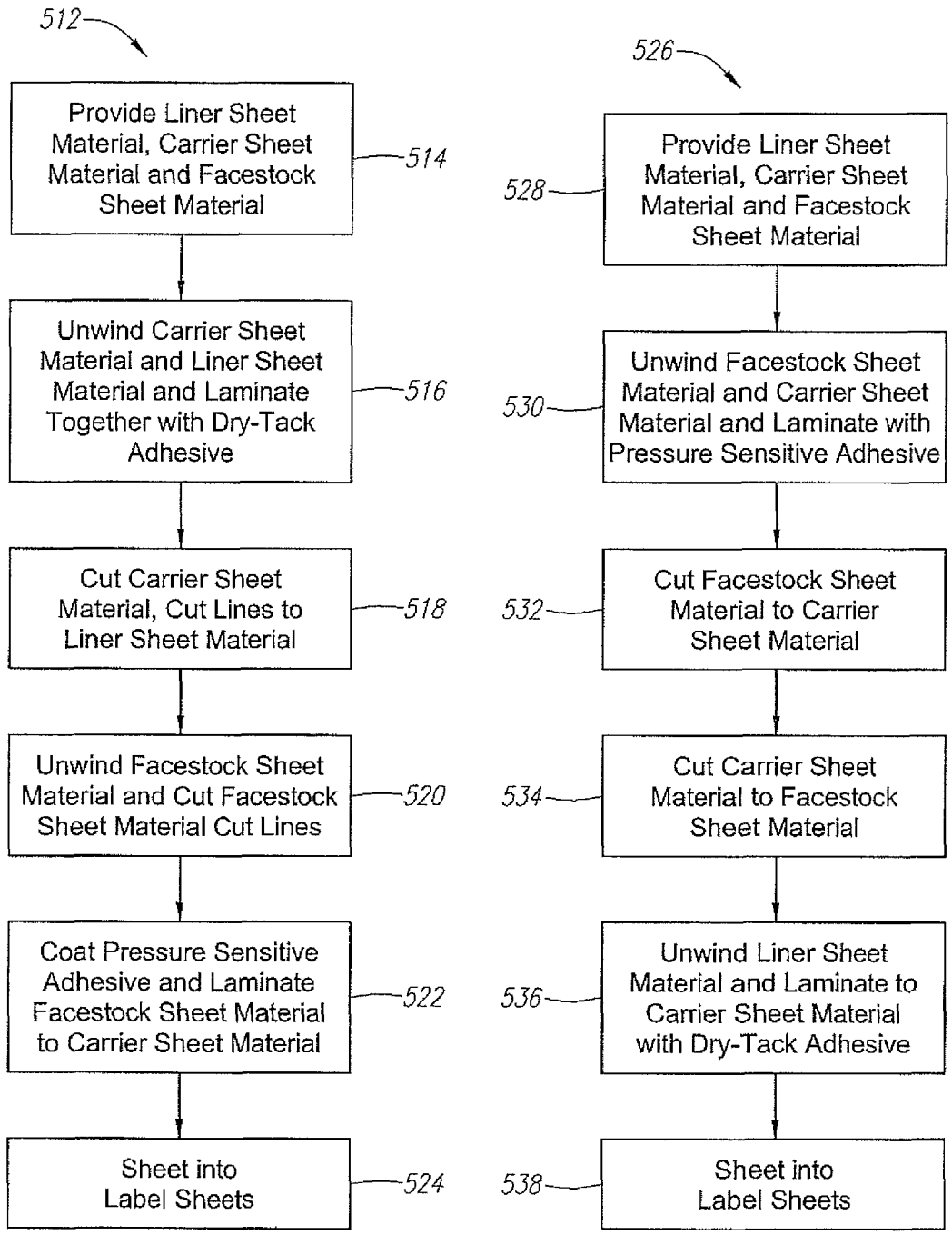
FIG. 52 is a flowchart of an example method to produce a label sheet assembly according to the invention.
FIG. 53 is a flowchart of another example method to produce a label sheet assembly according to the invention.

FIGS. 23-27 illustrate cut lines in the carrier sheet 156 that form the carrier strip, or part of the carrier strip. The cut lines are die cut lines through the carrier sheet, although, other types of cuts, for example, perforations and cuts and ties, can be used instead. One method 512 of making the cut lines is to laminate the carrier sheet to the liner sheet 158 with adhesive 166, as shown at 516 in FIG. 52. The cut lines are then cut through the carrier sheet, but not through the liner sheet as shown at 518 in FIG. 52. In an alternative method 526 of making the cut lines, as shown in FIG. 53, the carrier sheet is laminated to the facestock sheet 154 with pressure sensitive adhesive 162, as shown at 530 in FIG. 53. The cut lines are then cut through the carrier sheet, but not through the facestock sheet at 534. In yet other alternative methods, cuts in the carrier sheet or facestock sheet are made prior to lamination, for example, step 520 in FIG. 52. If the cuts are made prior to lamination, continuous die cuts can be used to produce carrier sheets as shown in FIGS. 24-27. However, the carrier sheet in FIG. 23 and the facestock sheets shown in FIGS. 31 and 32 include areas surrounded by cut lines. Perforated lines, cuts and ties, or other types of lines which facilitate the cut-out portion remaining attached to the carrier sheet, can be used for sheets with areas surrounded by cut lines.

Figure 23:
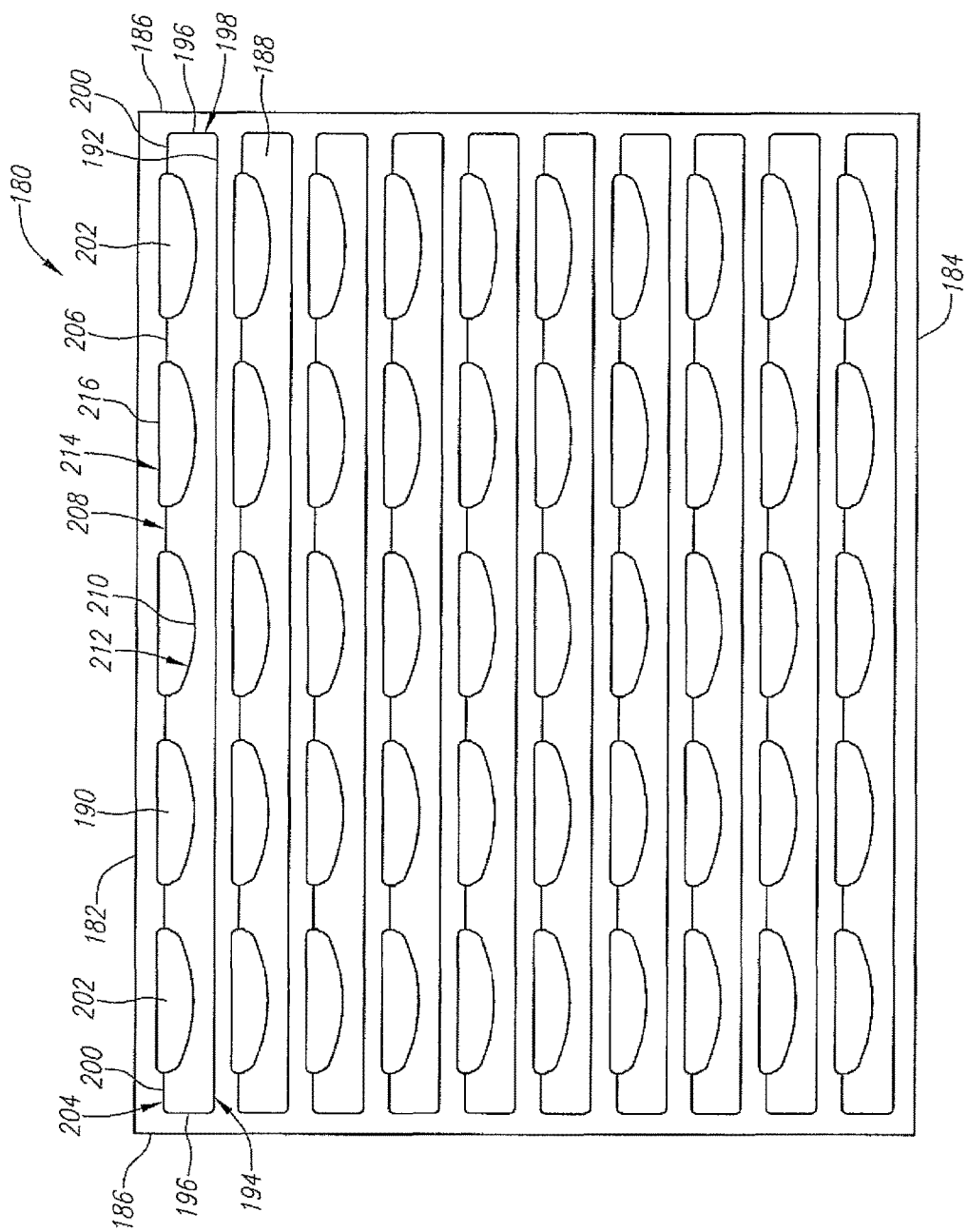
FIG. 23 is top plan view of a carrier sheet according to an embodiment of the present invention.
Figure 28:
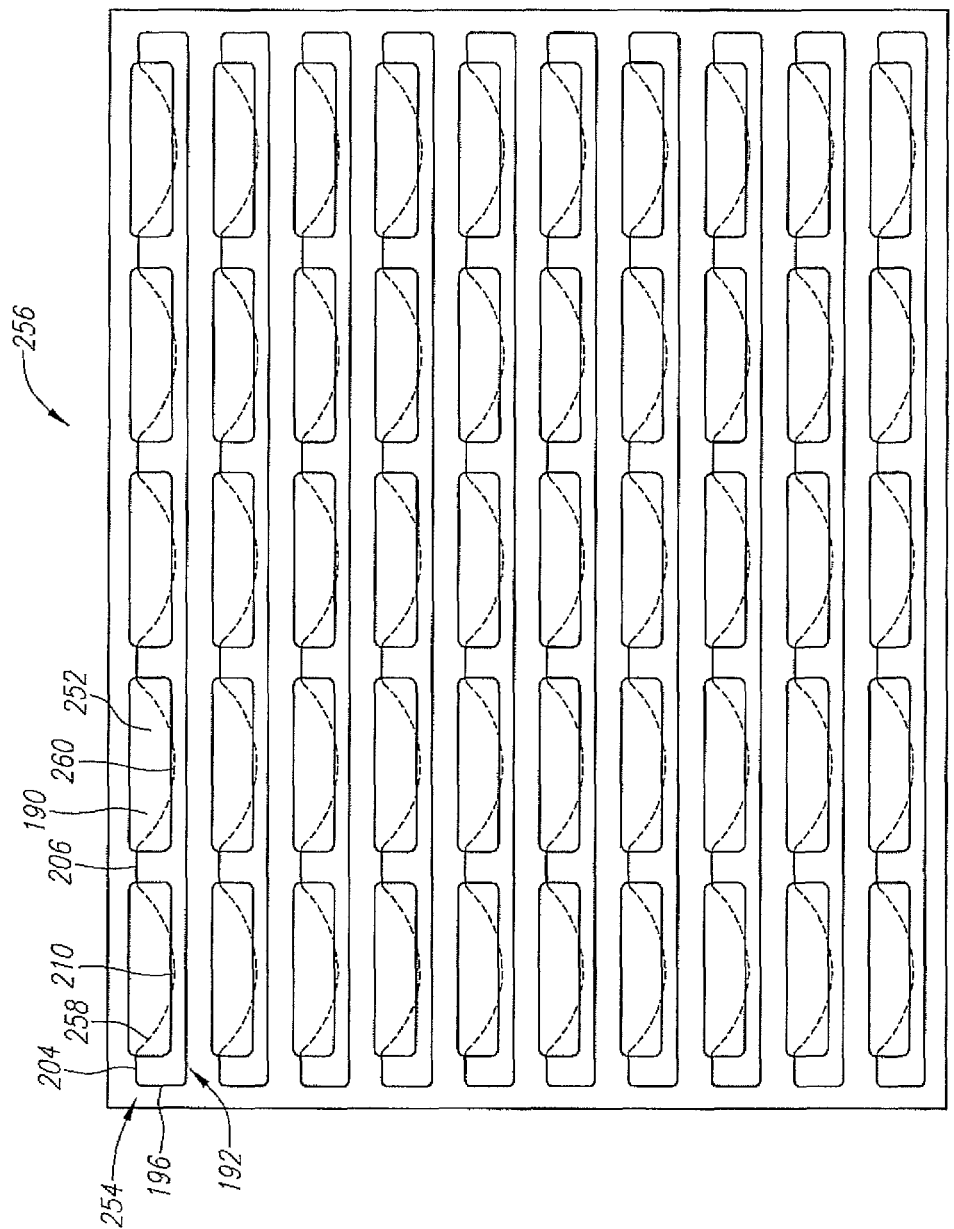
FIG. 28 is top plan view of a label sheet assembly according to an embodiment of the present invention.

Turning now to FIG. 23, a carrier sheet 180 is shown, for example, an 8.5 inches×11 inches carrier sheet. The sheet has top 182, bottom edges 184, and side edges 186. There are several cut lines in the carrier sheet that define a part of a carrier strip 188 and cut-out portions 190. The cut-out portions lie behind labels 252 cut in the facestock sheet 254, in FIG. 28, and are at least partially overlaid by the labels in the final label sheet assembly 256. There is a cut line 192 running most of the length of the carrier sheet corresponding to a bottom edge 194 of the carrier strip and cut lines 196 parallel to the sheet side edges defining side edges 198 of the carrier strip. Cut lines 200 between the side edge of the carrier strip and the end cut-out portions 202 define an end edge 204 of the carrier strip. The cut lines forming the end edges of the carrier strip and the cut lines 206 between the cut-out portions define a part of the top edge 208 of the carrier strip. A curved cut line 210, that also defines the bottom edge 212 of the cut-out portion, defines the remainder of the top edge of the carrier strip. A part of the curved cut line 258 will underlie a label in the label assembly sheet and another part of the curved line 260 will underlie the facestock sheet outside of the label. The top edge 214 of the cut-out portion is defined by a cut line 216 that corresponds to the top edge of the label in the facestock sheet. While the shape of the cut-out portion is shown as including a linear cut along the top edge and a curved cut along the bottom edge, other shapes can be used. For example, the cut-out portion can be similar in shape to an overlying label.

When the carrier strip is subsequently removed from the label sheet assembly, for example, see FIG. 39, the cut-out portions remain attached to the liner sheet. This is accomplished through appropriate choice of adhesives and release systems, in which case the adhesion between the carrier sheet and the liner sheet should be greater than the adhesion between the carrier sheet and the facestock sheet.

Figure 24:
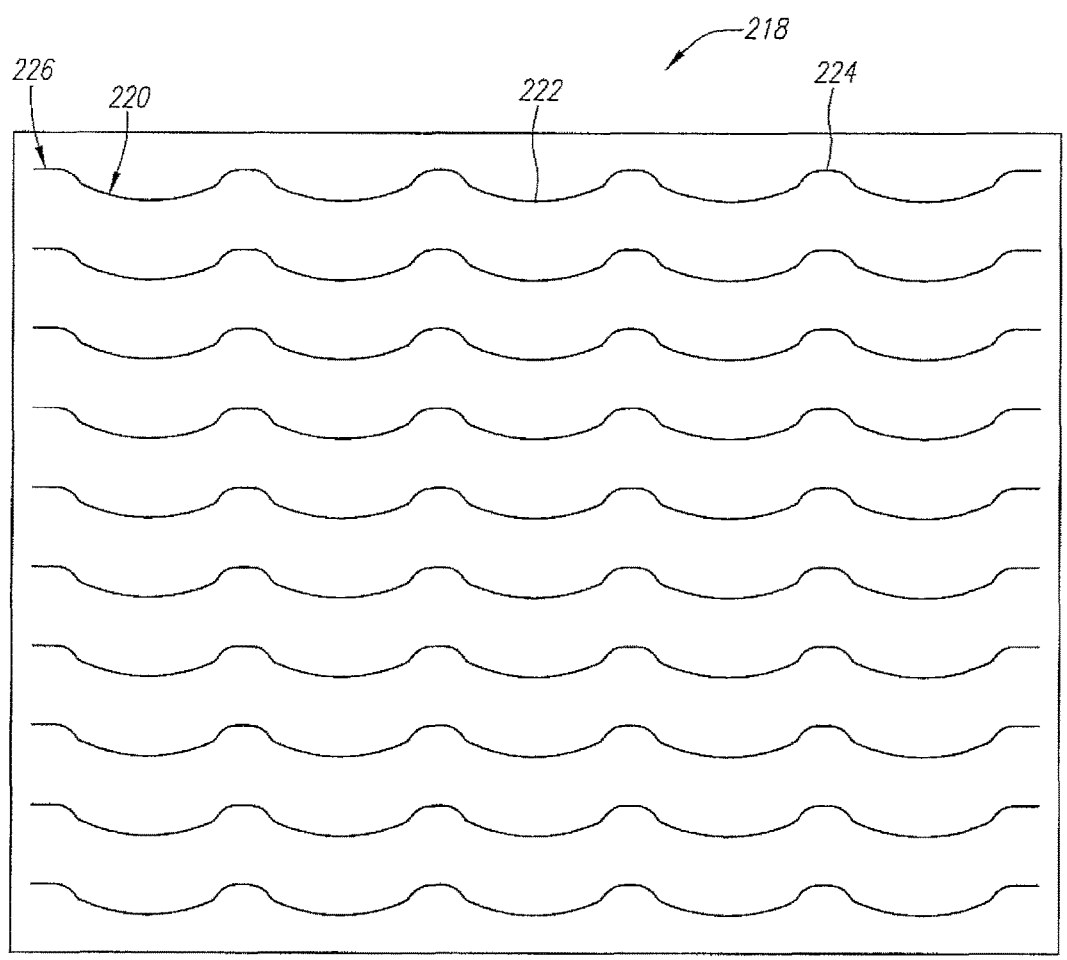
FIG. 24 is top plan view of a carrier sheet according to another embodiment of the present invention.

An alternative embodiment 218 is shown in FIG. 24. In this embodiment, the cut lines along bottom and side edges, 194 and 196 in FIG. 23, of the carrier strip 188 are not formed in the carrier sheet 218 at the same time as the top edge 220. The bottom and side edges of the carrier strip will be formed later with a single cut through the facestock sheet 154 and the carrier sheet, rather than a single cut in each of the carrier sheet and the facestock sheet that are aligned and coincident. Similar to the embodiment shown in FIG. 23, the top edge of the carrier strip is formed by curved cut lines 222 that will at least partially underlie labels 252, for example, see FIG. 28, cut in the facestock sheet in the final label sheet assembly 256, and by curved cut lines 224 between the label-overlaid curved cut lines. The end edge 226 of the carrier strip cut in the carrier sheet intersect the side edges 198, in FIG. 23, that subsequently will be cut through the facestock sheet and the carrier sheet.

Figure 25:
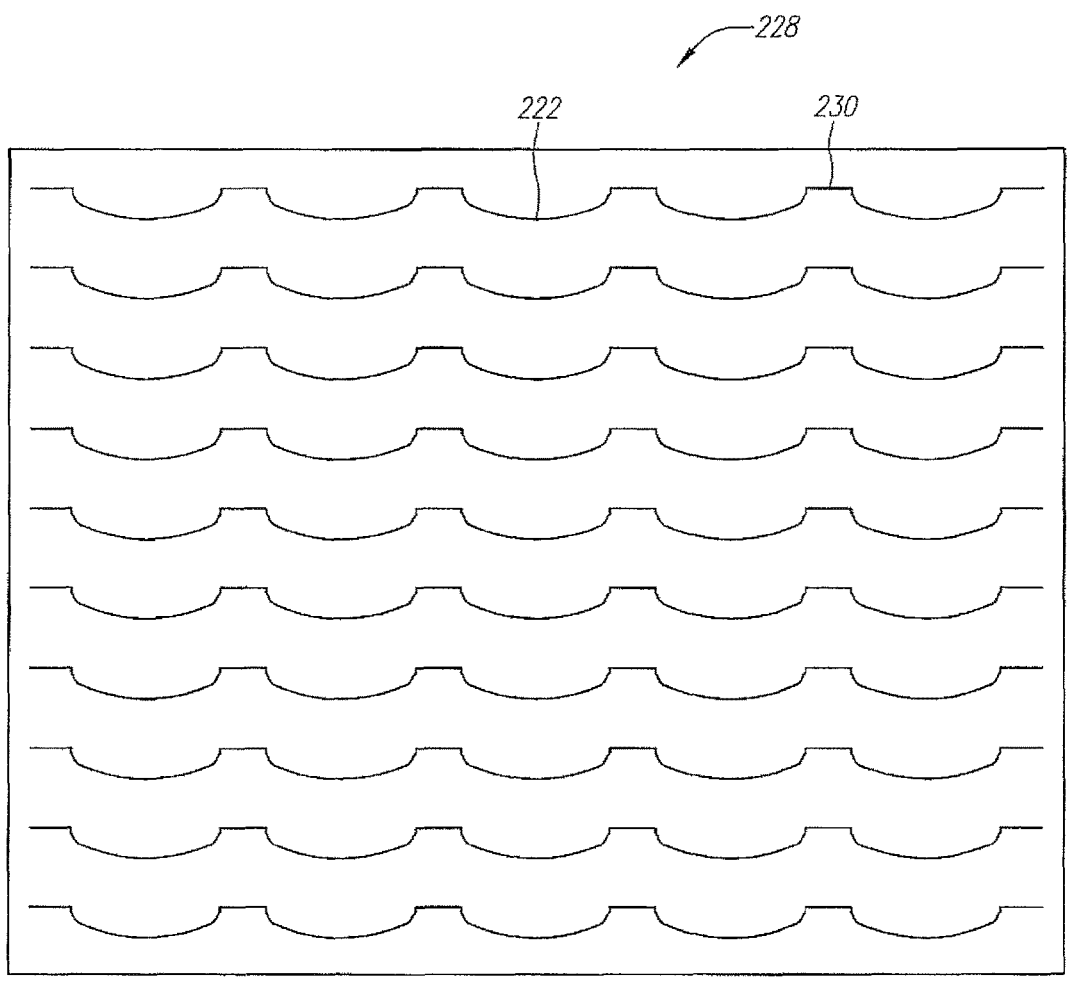
FIG. 25 is top plan view of a carrier sheet according to yet another embodiment of the present invention.

The alternative embodiment 228 shown in FIG. 25 is similar to the embodiment shown in FIG. 24. Instead of the curved cut lines 224 between the label-overlaid curved cut lines 222, the lines 230 in FIG. 25 are linear.

Figure 26:
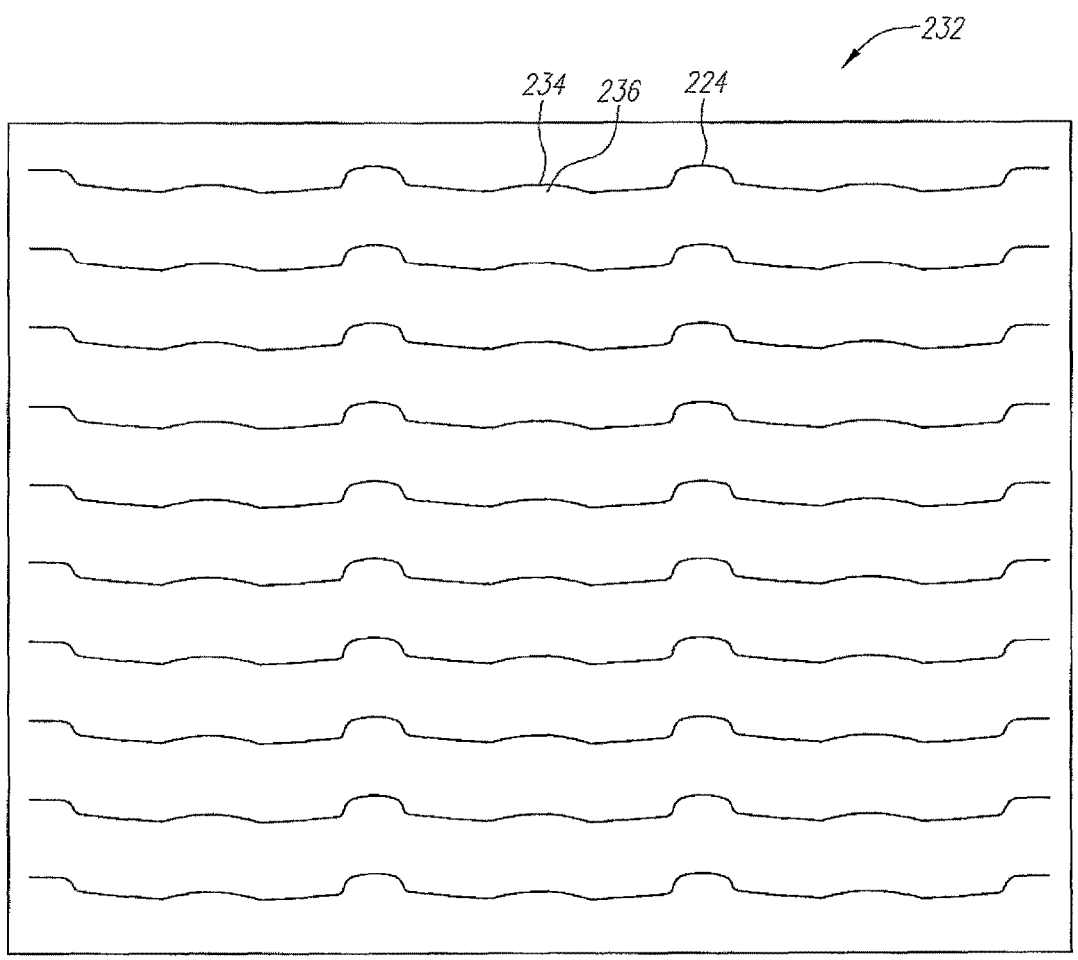
FIG. 26 is top plan view of a carrier sheet according to yet another embodiment of the present invention.
Figure 29:
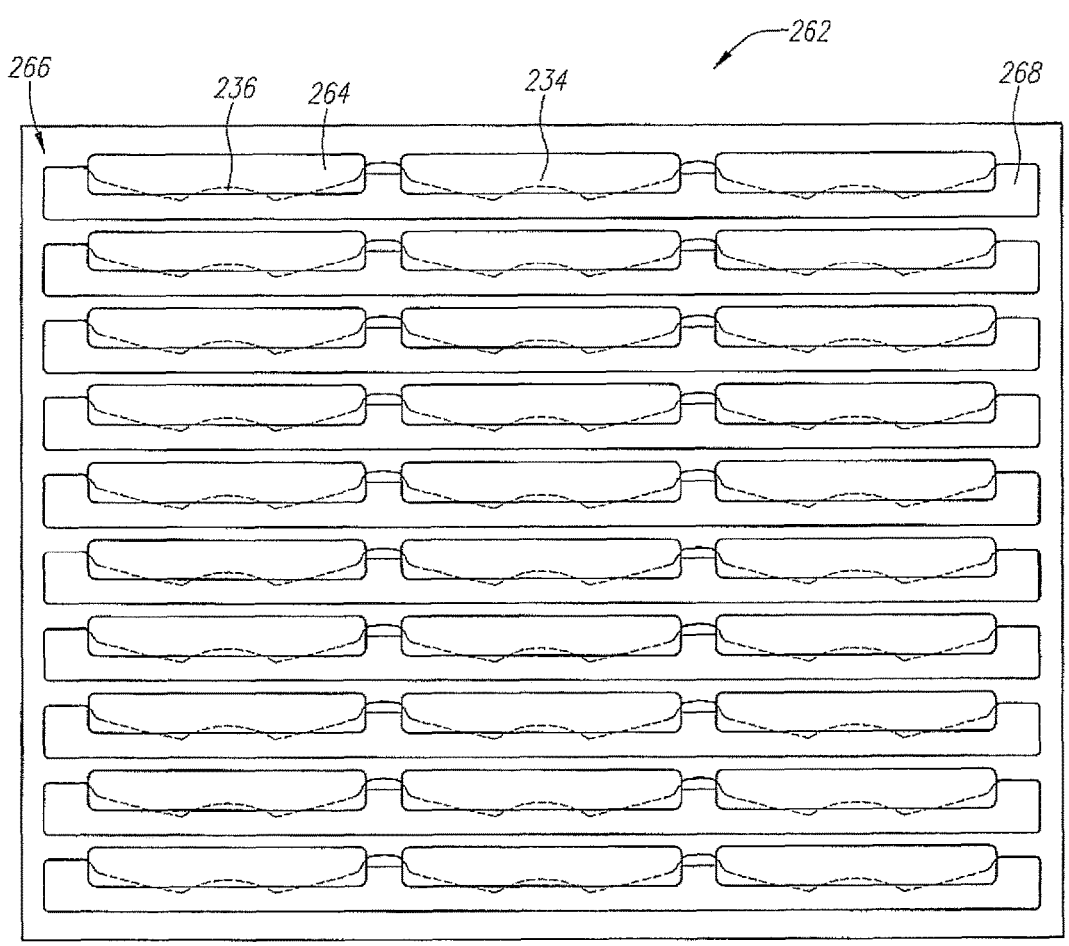
FIG. 29 is top plan view of a label sheet assembly according to another embodiment of the present invention.
Figure 35:
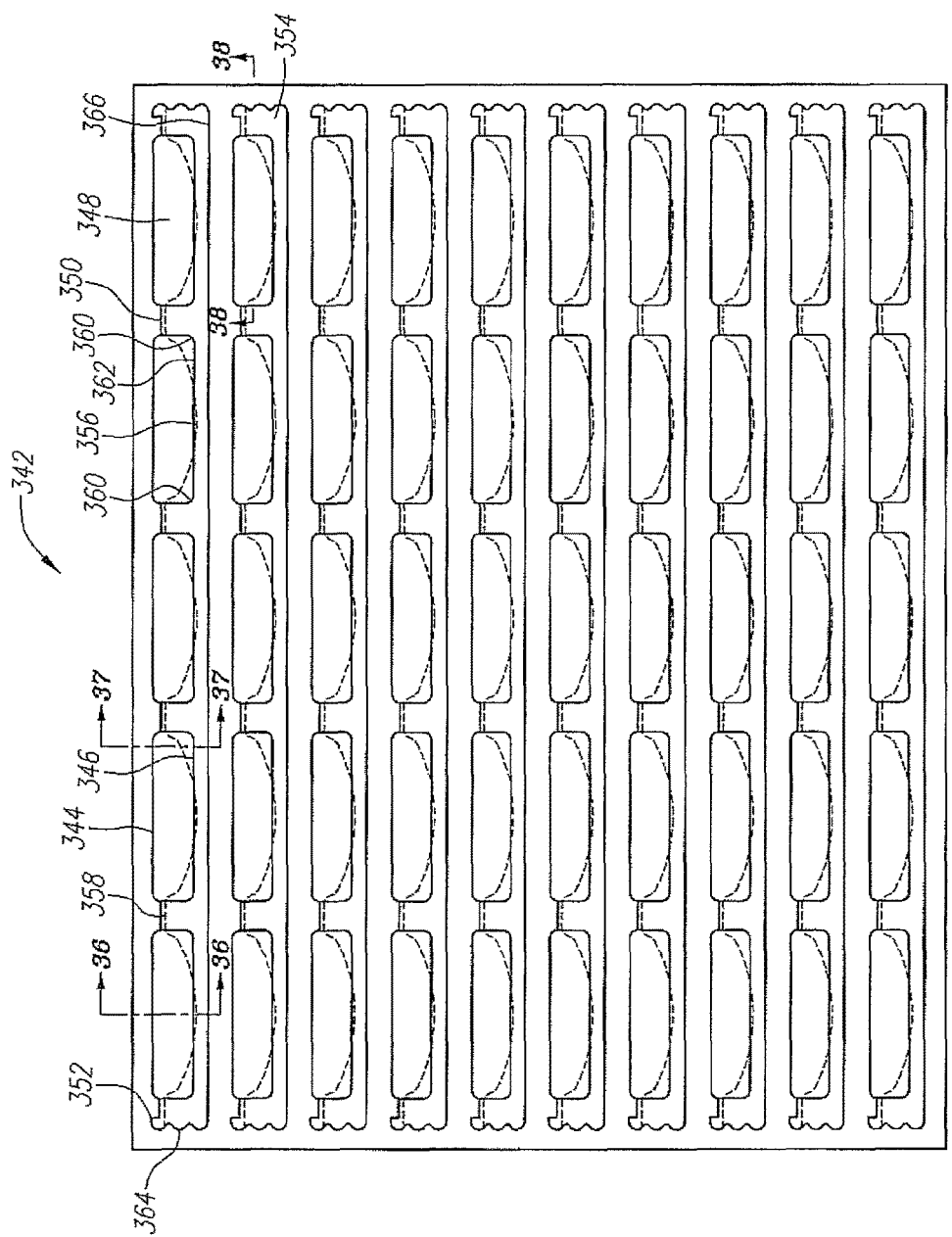
FIG. 35 is top plan view of a label sheet assembly according to an embodiment of the present invention.

Embodiments 180, 218, and 228 shown thus far have areas in the carrier sheet 156 that will underlie five labels 348 cut into the facestock sheet 154, for example, see FIG. 35. The embodiment 232 shown in FIG. 26 shows sets of cut lines in the carrier sheet 156 that will underlie three labels 264, see FIG. 29, cut into the facestock sheet 266. These labels are longer than those shown in FIGS. 23-25. When the carrier strip 268 is removed from the final label sheet assembly 262, longer labels may sag and become difficult to apply. Thus, the curved cut lines 234 that underlie labels cut in the facestock sheet can bow upward, forming another area 236 that underlies the facestock sheet label. This additional underlying area supports the middle portion of the label, thus reducing the label's ability to sag.

Figure 27:
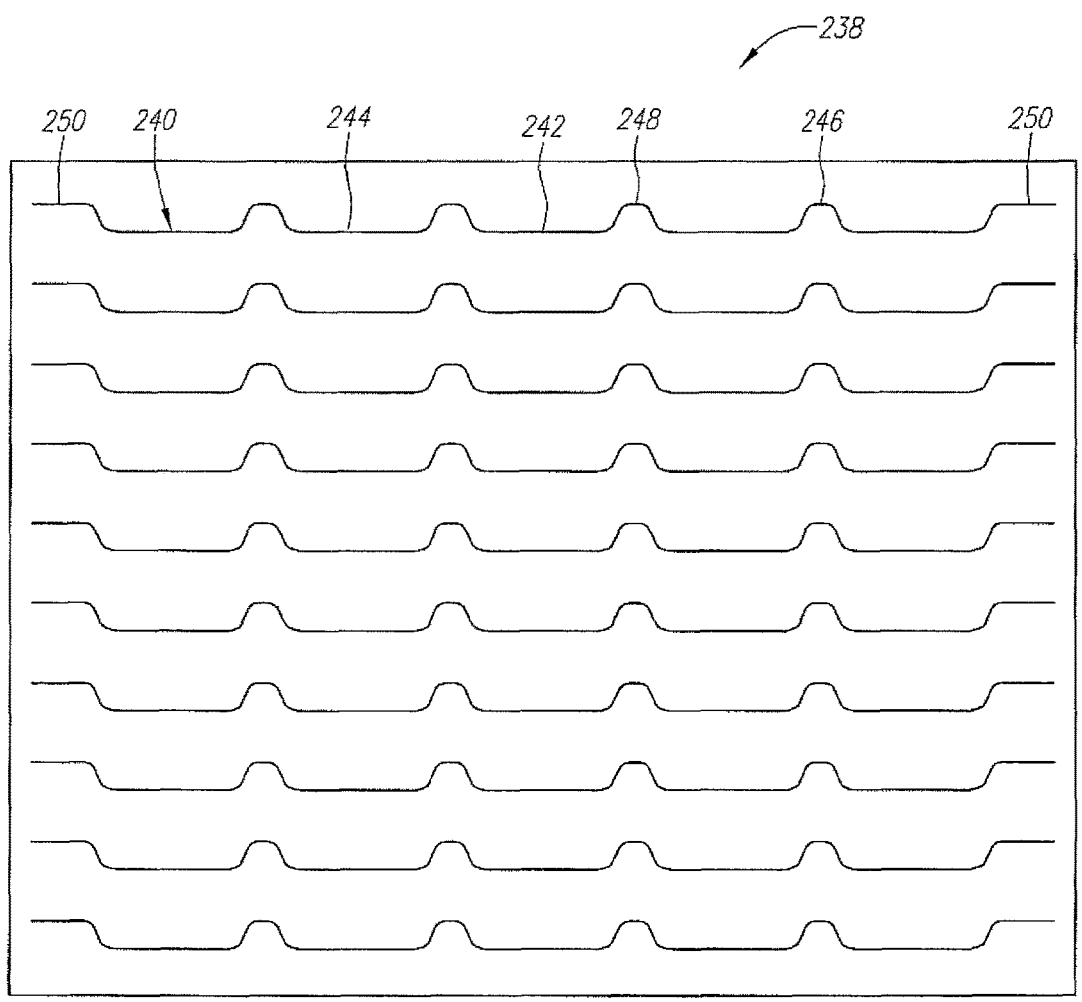
FIG. 27 is top plan view of a carrier sheet according to yet another embodiment of the present invention.
Figure 30:
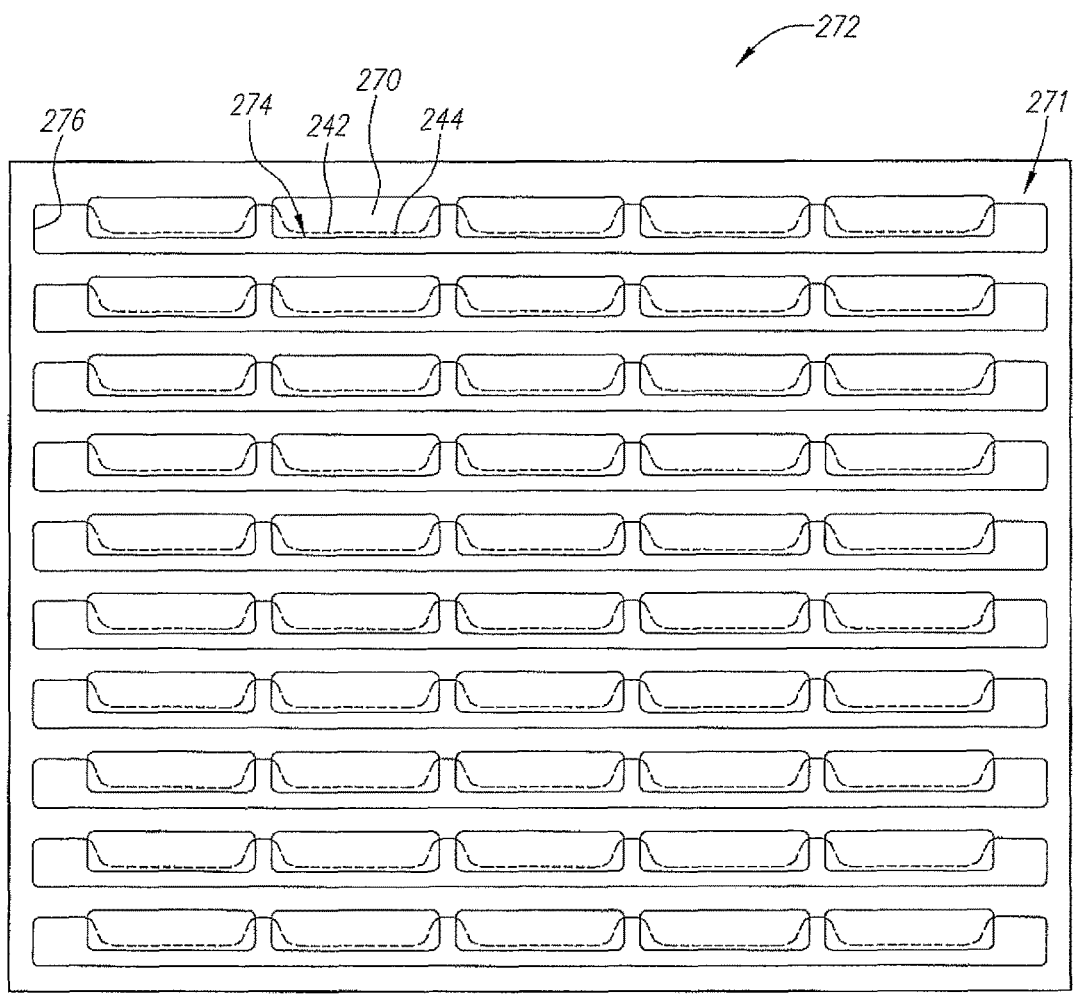
FIG. 30 is top plan view of a label sheet assembly according to yet another embodiment of the present invention.

Yet another embodiment 238 of a carrier sheet with cuts that form the top edge 240 of a carrier strip is shown in FIG. 27. The curved cut lines 242, see FIG. 30, that underlie the labels 270 cut in the facestock sheet 272 are shaped to follow the edge 274 of the label. This curved cut line in the carrier sheet is positioned such that a thin area 244 along the entire edge underlies the label, thereby holding the label in place when the carrier strip is removed. The curved cut lines 246 between the label-overlaid cut lines 242 include flattened portions 248. Both end edges 250 of the carrier strip are linear, and will intersect a cut line 276 that will be formed through the facestock sheet and the carrier sheet.

Figure 31:
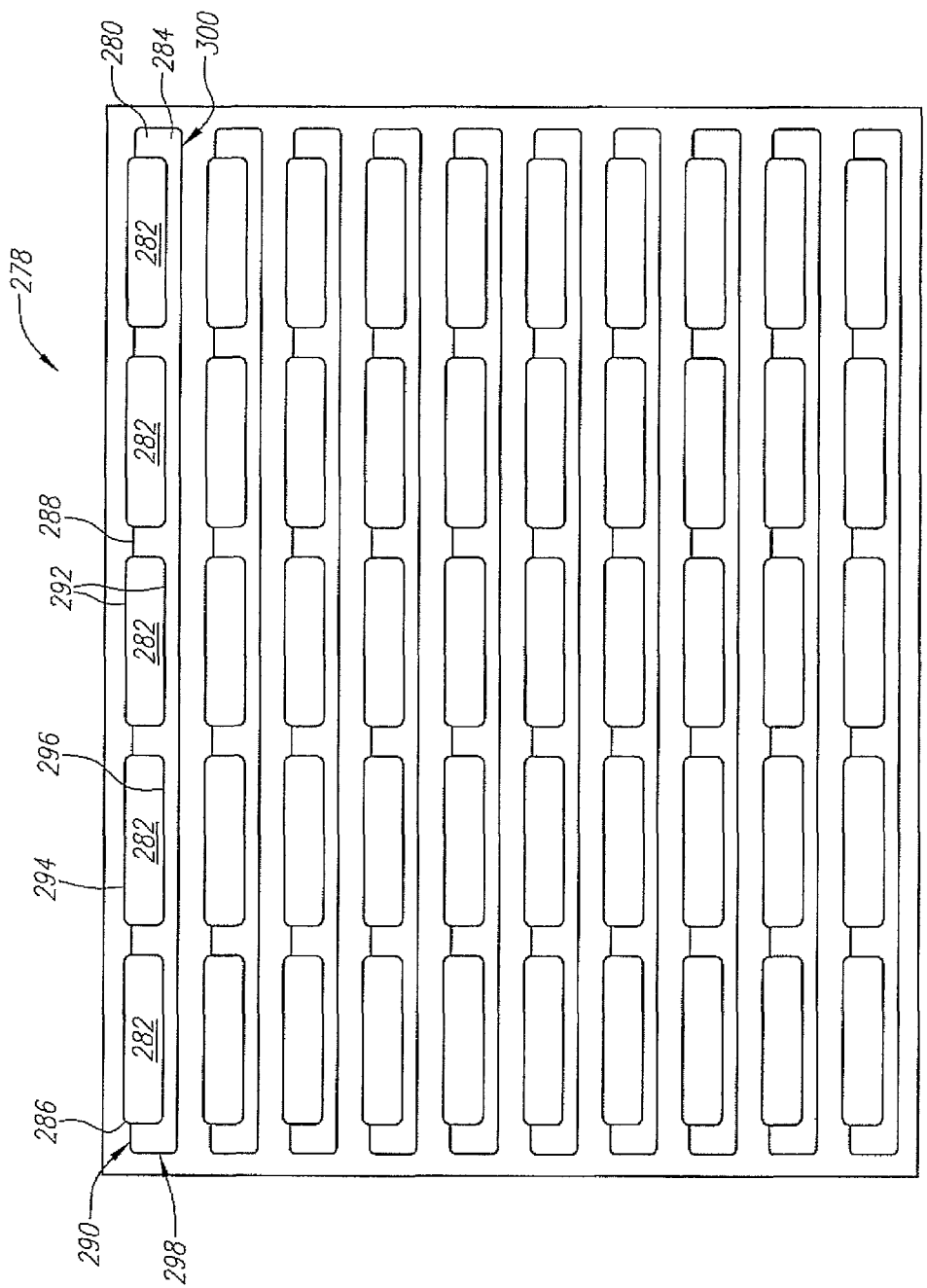
FIG. 31 is top plan view of a facestock sheet according to an embodiment of the present invention.

Turning now to the facestock sheets, example cut line patterns are shown in FIGS. 31-34. The cut lines in the facestock sheet 278 form an upper portion 284 of the carrier strip 280 and a set of labels 282 attached to the carrier strip. FIG. 31 shows an embodiment of facestock sheet cut lines. All the cut lines in FIG. 31 are through the facestock sheet, but not through the carrier sheet 156. The labels are shown with rounded corners 286, although other shapes, e.g., square-cornered labels, can be used. Between the labels 288 and at the end edges 290 of the carrier strip are linear cuts that intersect the label cut 292 such that there is a continuous cut line between all the labels. These cuts divide the label cuts into a top label cut 294 and a bottom label cut 296. There are additional cut lines in the facestock sheet that form side edges 298 and a bottom edge 300 of the carrier strip. In one alternative embodiment, the side edges, the bottom edge, the between label and end cuts, and the top label cut align and lie atop the corresponding cut lines in the carrier sheet. The carrier sheet shown in FIG. 23 can be used with the facestock sheet of FIG. 31, in appropriate alignment, to form a label sheet assembly of the invention.

Figure 32:
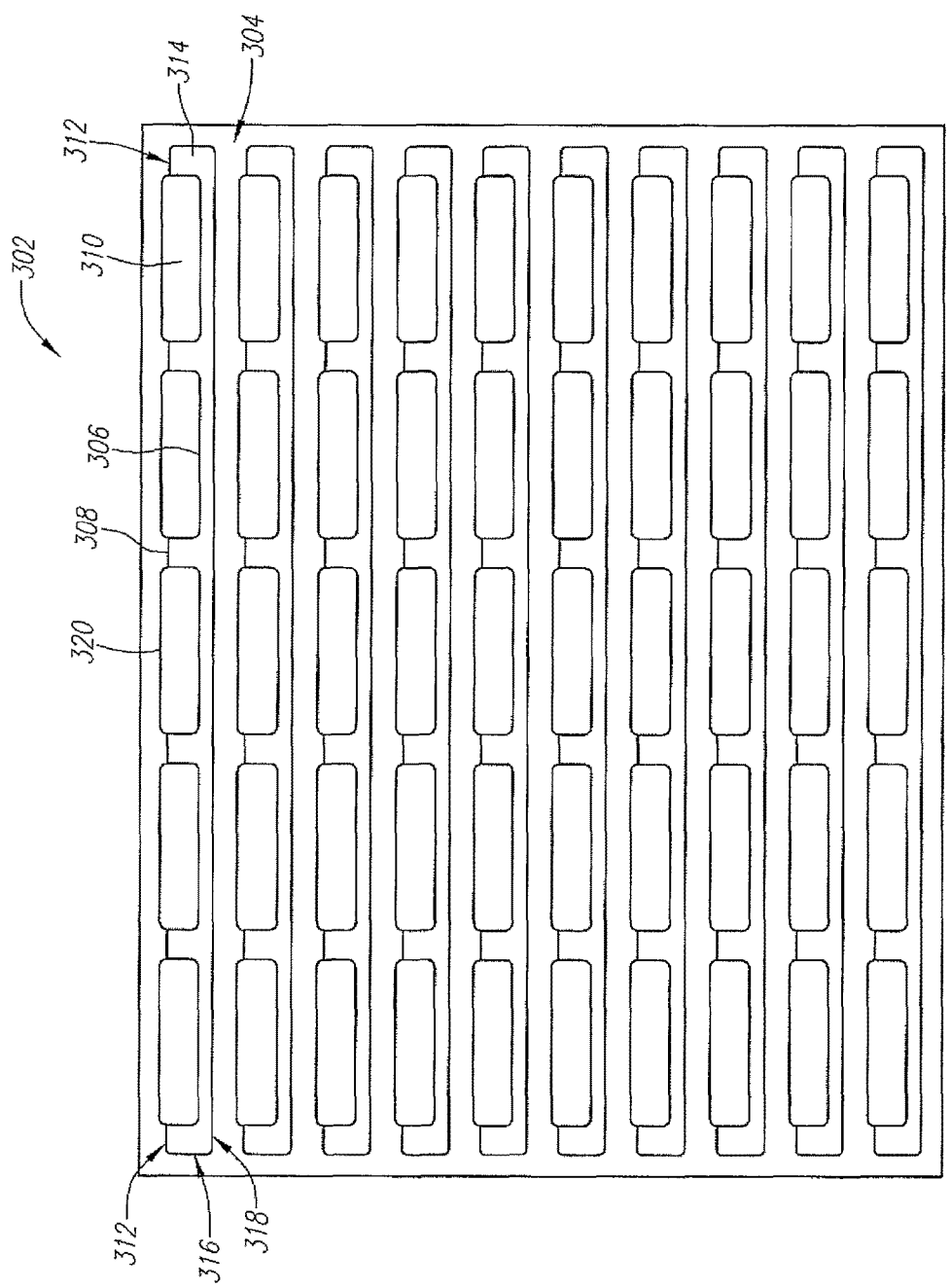
FIG. 32 is top plan view of a facestock sheet according to another embodiment of the present invention.

FIG. 32 shows another alternative embodiment 302 of facestock sheet cut line patterns. The cut line pattern shown in FIG. 32 differs from the pattern in FIG. 31 in that some of the lines are cut through only the facestock sheet 304, while others cut through both the facestock sheet and the carrier sheet 156. Lines forming the bottom label cut 306 are formed in the facestock sheet but not the carrier sheet. Lines forming the top label cut 320 can be cut through both the facestock sheet and the carrier sheet, or through the facestock sheet only. Lines 308 between the labels 310 and at the end edge 312 of the carrier strip 314 can be cut through both the facestock sheet and the carrier sheet, or in some alternative embodiments, through the facestock sheet but not the carrier sheet because the carrier sheet cuts may already exist. Lines forming the side edge 316 of the carrier strip and the bottom edge 318 of the carrier strip can be cut through the facestock sheet and the carrier sheet.

Figure 33:
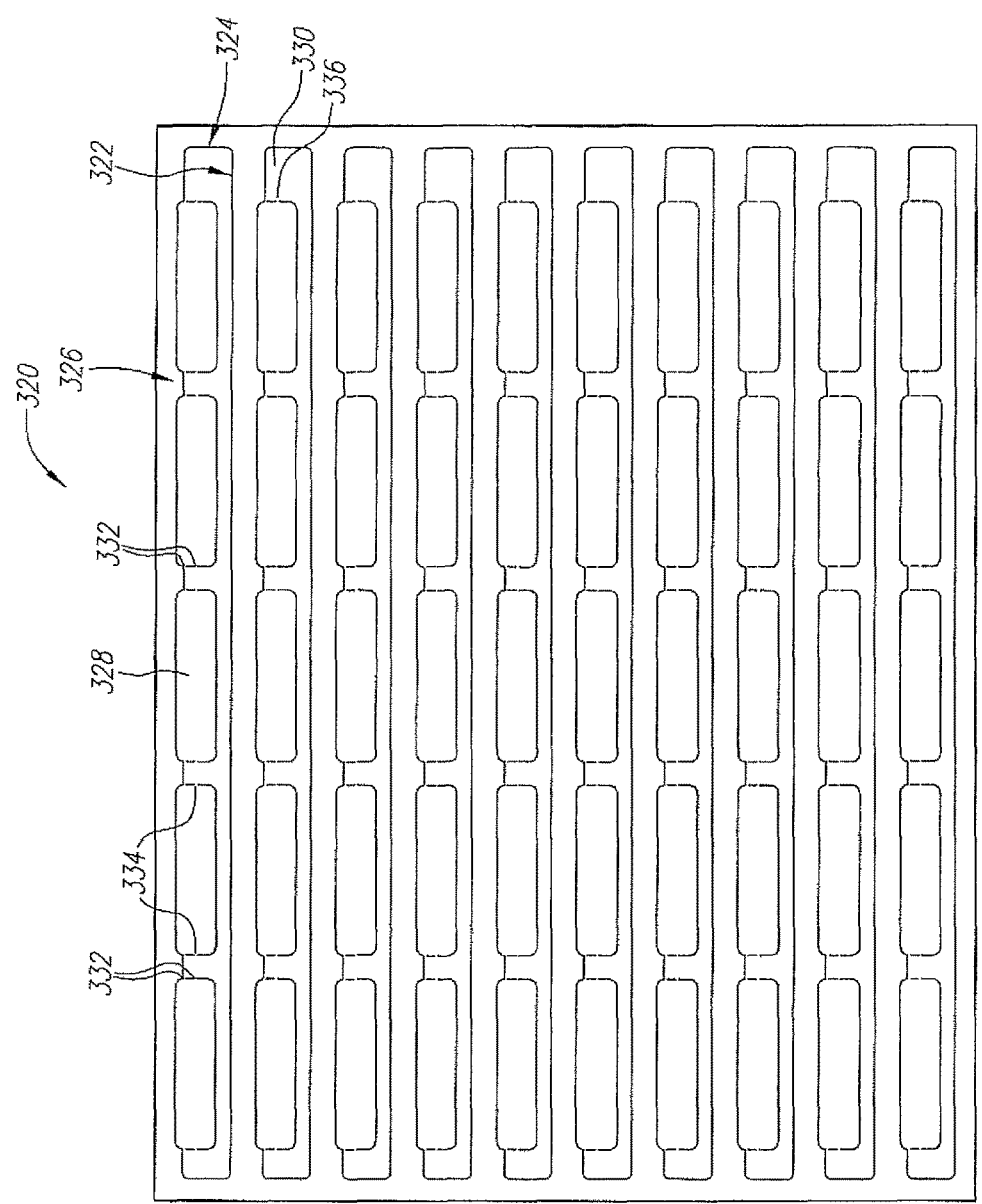
FIG. 33 is top plan view of a facestock sheet according to yet another embodiment of the present invention.

Yet another embodiment 320 of facestock cut line patterns is shown in FIG. 33. As in other embodiments, the bottom edge 322 and the side edges 324 of the carrier strip cuts in the facestock sheet 326 can be through the facestock sheet, or through both the facestock sheet and the carrier sheet 156. In this embodiment, cut lines in the carrier sheet will not underlie the labels 328. Thus, in order for the label to be removed with the carrier strip 330, ties 332 connect the label to the facestock portion 336 of the carrier strip. Ties are small, uncut areas between the label and the facestock sheet portion of the carrier strip. The ties are located on end portions 334 of the labels, and in this embodiment, two ties on each end are shown. The ties must be large enough, and numerous enough, to facilitate pulling the label from the release layer 168 on the carrier sheet, yet small enough to be easily broken when the label is applied to the final substrate and the carrier strip is pulled away. In one embodiment, ties are 0.010 inch long. In an alternative embodiment, ties are 0.008 inch long.

Figure 34:
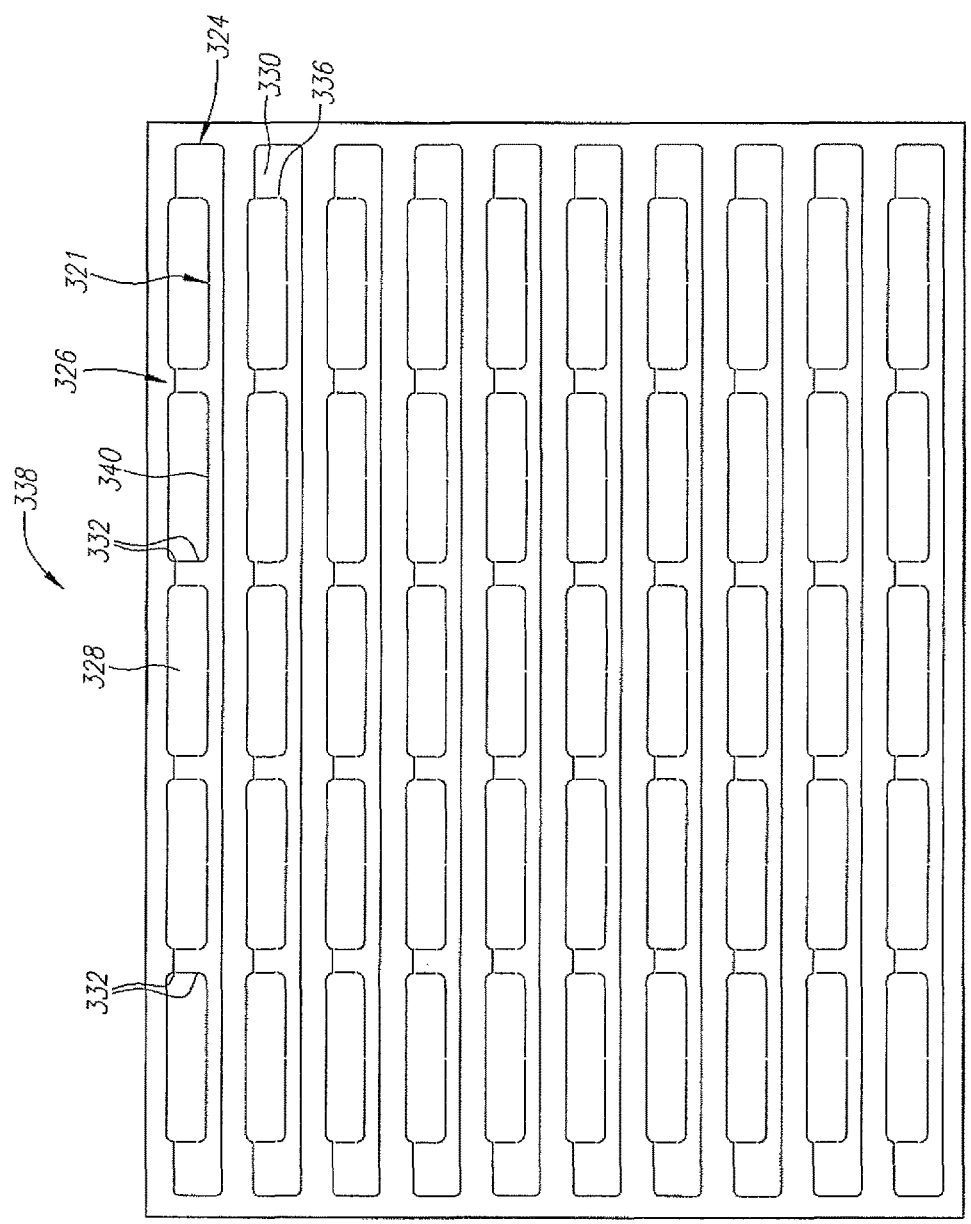
FIG. 34 is top plan view of a facestock sheet according to yet another embodiment of the present invention.

The alternative embodiment 338 shown in FIG. 34 is similar to the embodiment of FIG. 33, except for the addition of a tie 340 along the bottom edge 321 of the label 328. Ties along the bottom edge of the label facilitate removal of long labels, in particular. While one tie is shown along the bottom edge, additional ties along the bottom edge can be present, as long as the ties are easily broken when the label is applied to the final substrate and the carrier strip is pulled away.

A number of exemplary carrier sheet cut line patterns and facestock sheet cut line patterns have been provided. These and other similarly-cut carrier sheets and facestock sheets can be combined to provide label sheet assemblies of the present invention. Several illustrative embodiments are now shown and described.

One embodiment 342 of a label sheet assembly is shown in FIG. 35. FIG. 35 shows a liner sheet 158 adhered to one side 164 of a carrier sheet 156 with a dry-tack adhesive 166. The other side 160 of the carrier sheet is coated with a silicone release coating 168. A facestock sheet 154 is adhered to the release coated side of the carrier sheet with a pressure sensitive adhesive 162. The cut lines in the carrier sheet are the same as those shown in FIG. 25 and the cut lines in the facestock sheet are the same as those shown in FIG. 32, except for the cuts forming the side edges of the carrier strip in both the carrier sheet and the facestock sheet. Thus, cut lines 344, 346 forming the labels 348, cut lines 350 between the labels, and small portions of the end edge 352 of the carrier strip 354 are cut through the facestock but not the carrier sheet (see FIGS. 36-38). The labels at least partially overlay curved cut lines 356 in the carrier sheet. The label-overlaid curved cut lines and cut lines 358 between the label-overlaid curved lines are cut through the carrier sheet but not the facestock sheet. The label-overlaid curved cut lines are shown with two corners 360 of each label, and a substantial portion of the adjacent side 362 of the label, overlying the carrier strip. Alternatively, the label-overlaid curved cut line can be configured such that more or less of the adjacent side of the label overlays the carrier strip. Cut lines forming the side edges 364 of the carrier strip and the bottom edge 366 of the carrier strip are cut through the facestock sheet and the carrier sheet.

Figure 39:
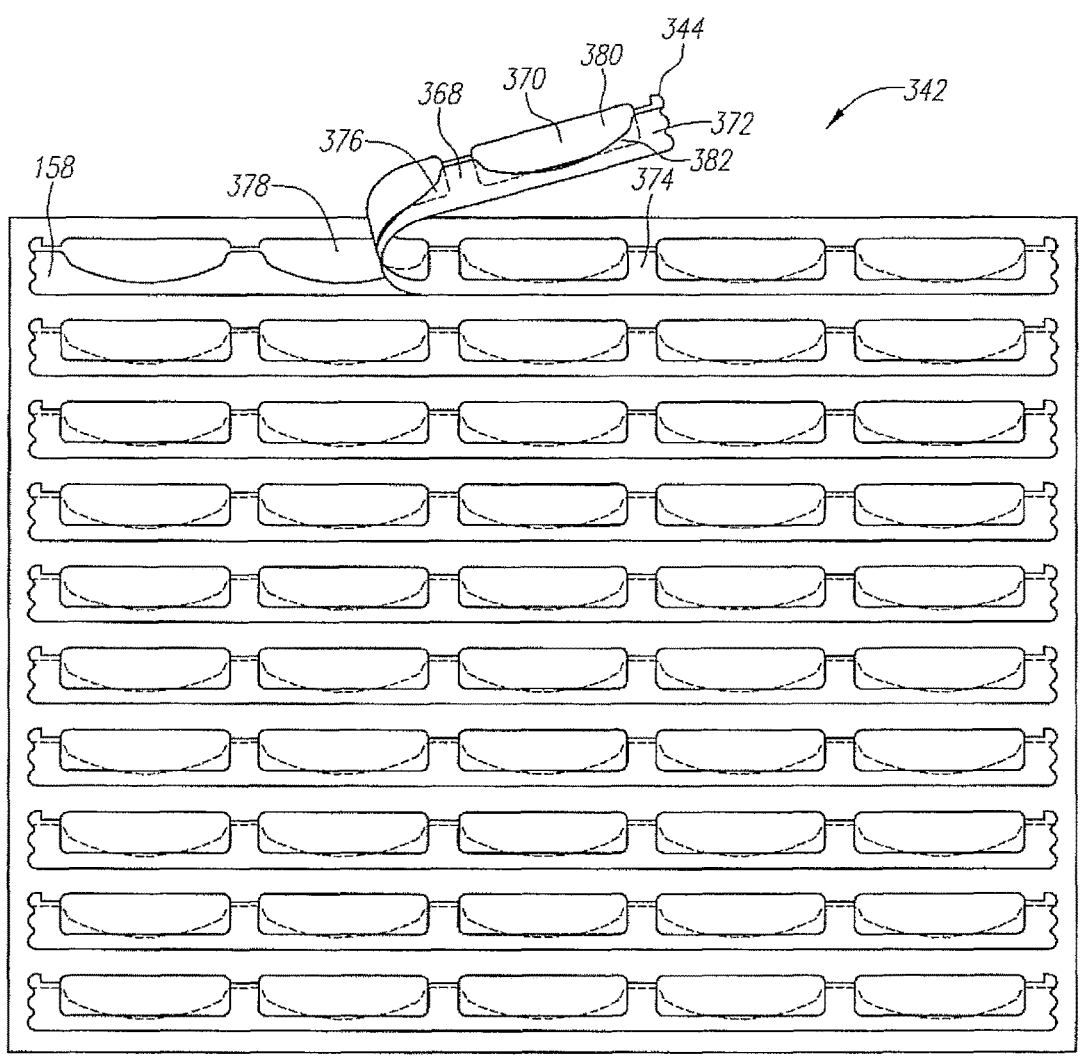
FIG. 39 is top plan view of the label sheet assembly of FIG. 35 illustrating a carrier strip and labels being removed according to an embodiment of the present invention.
Figure 56:
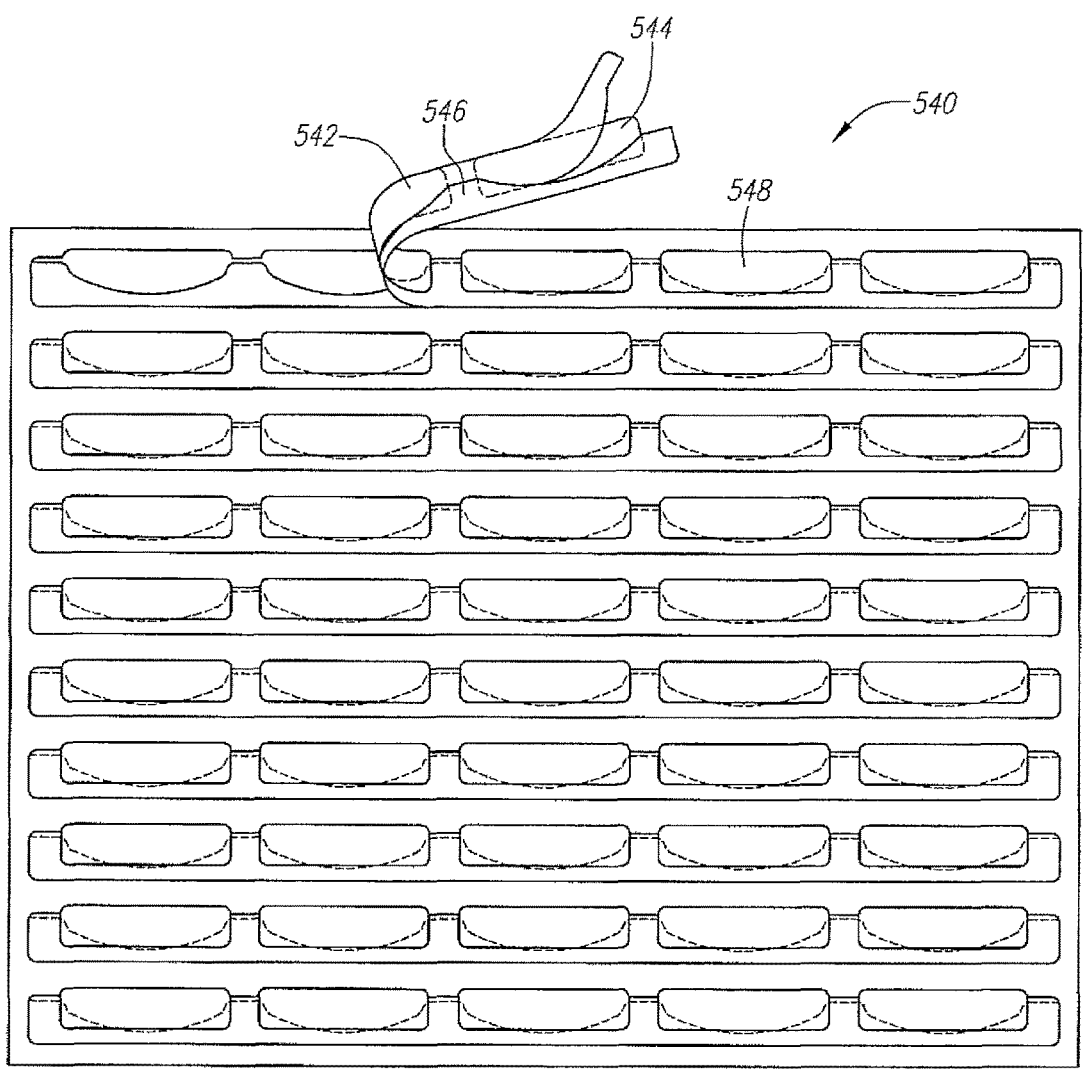
FIG. 56 is top plan view of the label sheet assembly illustrating a carrier strip and labels being removed according to yet another embodiment of the present invention.

A carrier strip 368 being removed with attached labels 370 from the embodiment 342 of FIG. 35 is shown in FIG. 39. As can be clearly seen in FIG. 39, the carrier strip includes a portion of the carrier sheet 372 and a portion of the facestock sheet 374. In this example, a user grasps the left edge of the carrier strip, pulling it up and to the right. The carrier strip and the labels that partially overlap the carrier strip are removed from the label sheet assembly 342. Thus, a portion of the carrier sheet 372 is separated from the liner sheet 158 and the remainder of the carrier sheet 378, and forms part of the carrier strip. The labels are adhered to the carrier strip by a small overlap portion 376, which facilitates the labels peeling away from the portion of the carrier sheet that remains attached 378 to the liner sheer. When the carrier strip is in the peeled away position, the pressure sensitive adhesive-coated back surfaces 380 of the labels are exposed. In one embodiment, a dry-tack adhesive 166 may or may not remain on the back surface 382 of the carrier strip after the carrier strip is removed. Regardless of where the dry-tack adhesive ends up, the carrier strip provides a tack-free handle for manipulating the labels into a position for application to a substrate. In an alternative embodiment in which a removable or ultraremovable adhesive is used to adhere the carrier sheet to the liner sheet, the adhesive can remain with the liner sheet or with the carrier strip. If the removable adhesive remains with the liner sheet, the back surface of the carrier strip is tack-free. If the removable adhesive, or a portion of the removable adhesive, remains with the carrier strip, the back surface of the carrier strip will be tacky. However, the removable adhesive will facilitate removal of the carrier strip from a substrate while the labels, which are backed with a more aggressive pressure sensitive adhesive, will adhere to the substrate. In another embodiment shown in FIG. 56, when the carrier strip 546 and labels 548 are peeled away from the label sheet assembly 540, a backing strip 542 is also removed and covers the pressure sensitive adhesive-back surface 544 to protect the adhesive. The backing strip is subsequently removed before the labels are applied to a substrate.

Figure 40:
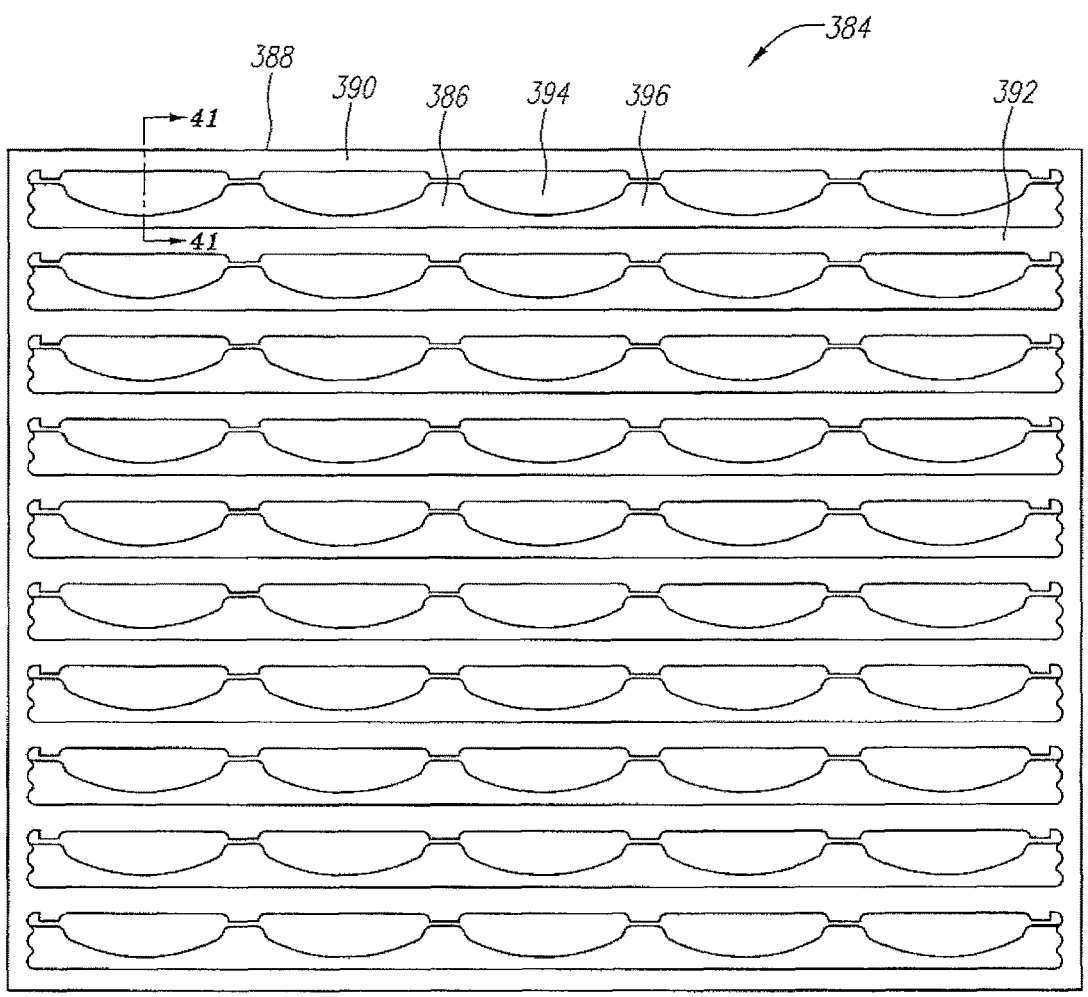
FIG. 40 is top plan view of the label sheet assembly of FIG. 35 after all carrier strips and labels are removed according to an embodiment of the present invention.
Figure 41:
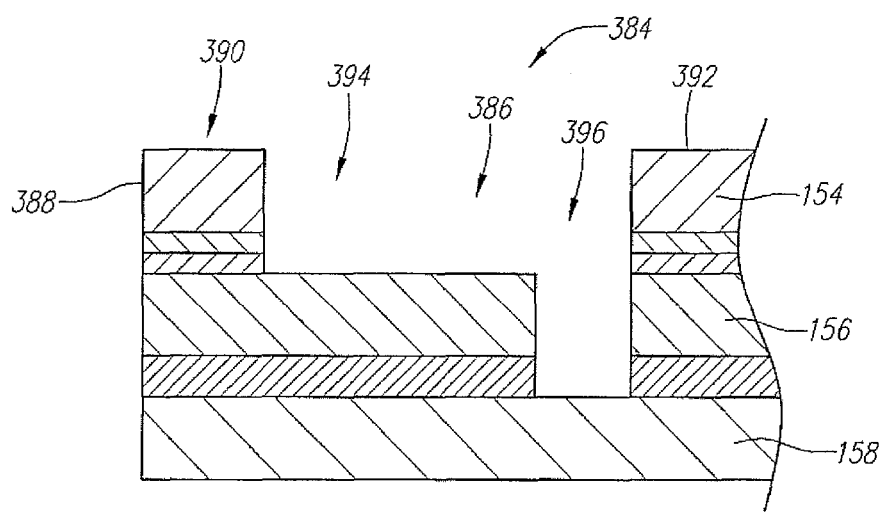
FIG. 41 is an enlarged sectional view of the sheet of FIG. 40 taken along line 41-41 according to an embodiment of the present invention.

FIG. 40 shows the sheet 384 of the embodiment 342 of FIG. 35 with all the carrier strips 354 and labels 348 removed. Surrounding the area 386 where the carrier strip was adhered to the label assembly 342 are areas 390 between the edge 388 of the label assembly sheet and the carrier strip. These areas include portions of the facestock sheet 154, the carrier sheet 156, and the liner sheet 158. Areas 392 between the carrier strips also include portions of the facestock sheet, the carrier sheet, and the liner sheet. There are interconnected areas 394 underneath the labels and carrier strip that include a portion of the carrier sheet and the liner sheet after the carrier strip and labels are removed from the label assembly sheet. There is also an area 396 underneath the labels and carrier strip that includes the liner sheet. All of these areas are also shown in a cross-sectional view in FIG. 41.

With the exception of the embodiment shown in FIG. 26, all embodiments have shown a label sheet assembly that includes five labels associated with each carrier strip, and ten carrier strips per label sheet assembly. One skilled in the art would recognize that the number of labels associated with each carrier strip is easily changed by changing the length of the label. Label sheet assemblies having three, five, eight, twelve, or any number of labels can be produced. Likewise, one skilled in the art would recognize that the number of carrier strips per sheet can be changed as well. By altering the spacing between carrier strips, or by altering the width of the carrier strip and labels, more than ten or fewer than ten carrier strips per label sheet assembly are possible. Accordingly, label sheet assemblies having various numbers of labels and carrier strips fall within the scope of this invention.

Figure 42:
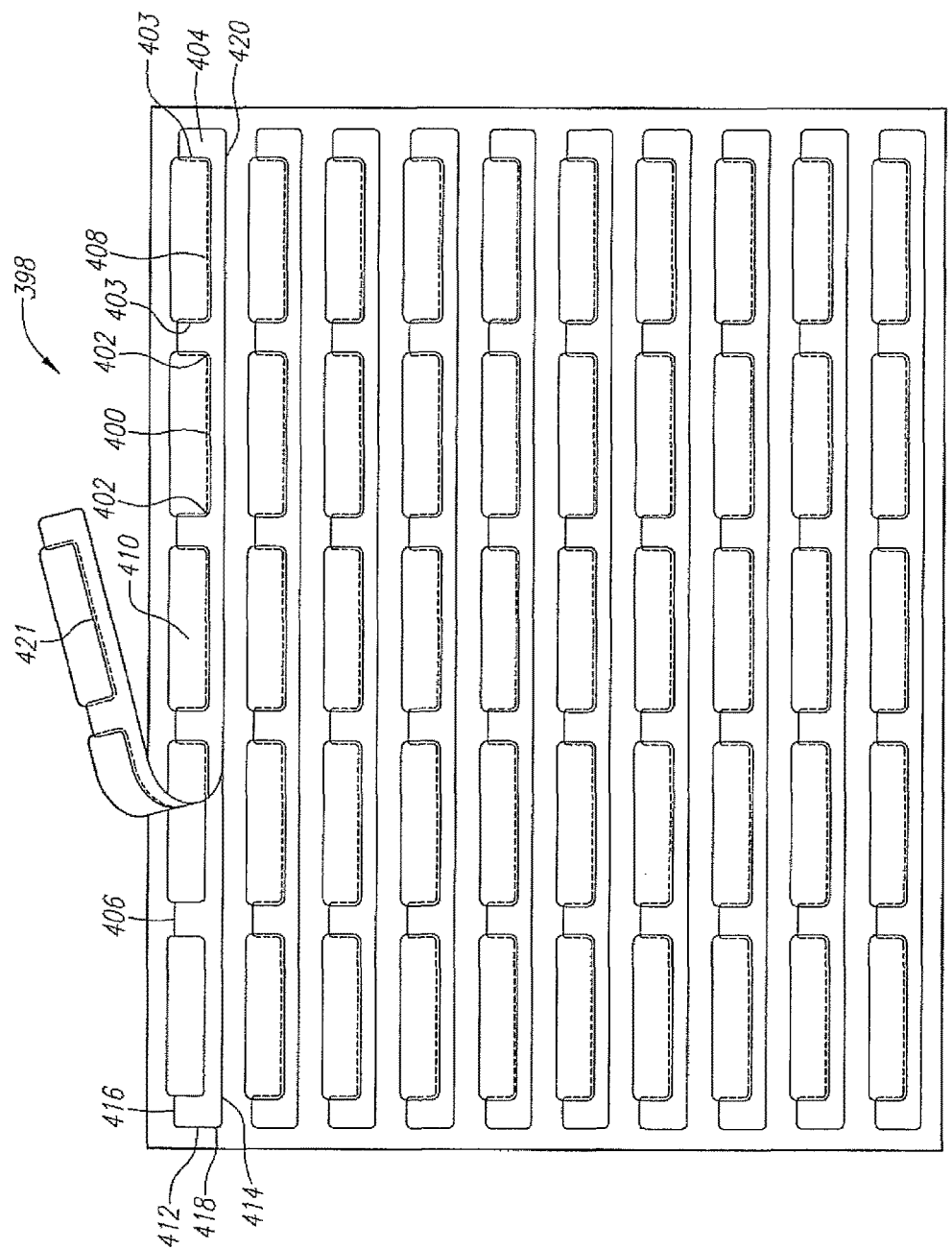
FIG. 42 is top plan view of the label sheet assembly illustrating a carrier strip and labels being removed according to another embodiment of the present invention.

FIG. 35 shows an embodiment 342 with a portion of label side 362 adjacent two corners 360 overlying a carrier strip 354. An alternative embodiment 398 in which the entire adjacent side 400 of the label 410 between two corners 402 overlies the carrier strip 404 is shown in FIG. 42. In this embodiment, the entire top edge 406 of the carrier strip can be cut into the carrier sheet 156. In an alternative embodiment, just the cut lines 408 that underlie the labels can be cut into the carrier sheet. In these two embodiments, the cut lines 412, 414, 416 that complete the carrier strip will be cut through both the facestock sheet and the carrier sheet. In yet another embodiment, the entire carrier strip can be cut into the carrier sheet as shown in FIG. 23. Returning to the embodiment of FIG. 42, labels are cut into the facestock sheet 154. The side edges 418 of the carrier strip and the bottom edge 420 of the carrier strip are cut through the facestock sheet and the carrier sheet. The carrier strip formed in this embodiment is removed in a similar manner to the carrier strip 368 shown in FIG. 39. In this case, the label will be held onto the carrier strip during removal and manipulation by a small overlap 421 between the bottom edge 400 and portions of two ends 403 of the label and the carrier strip.

Figure 43:
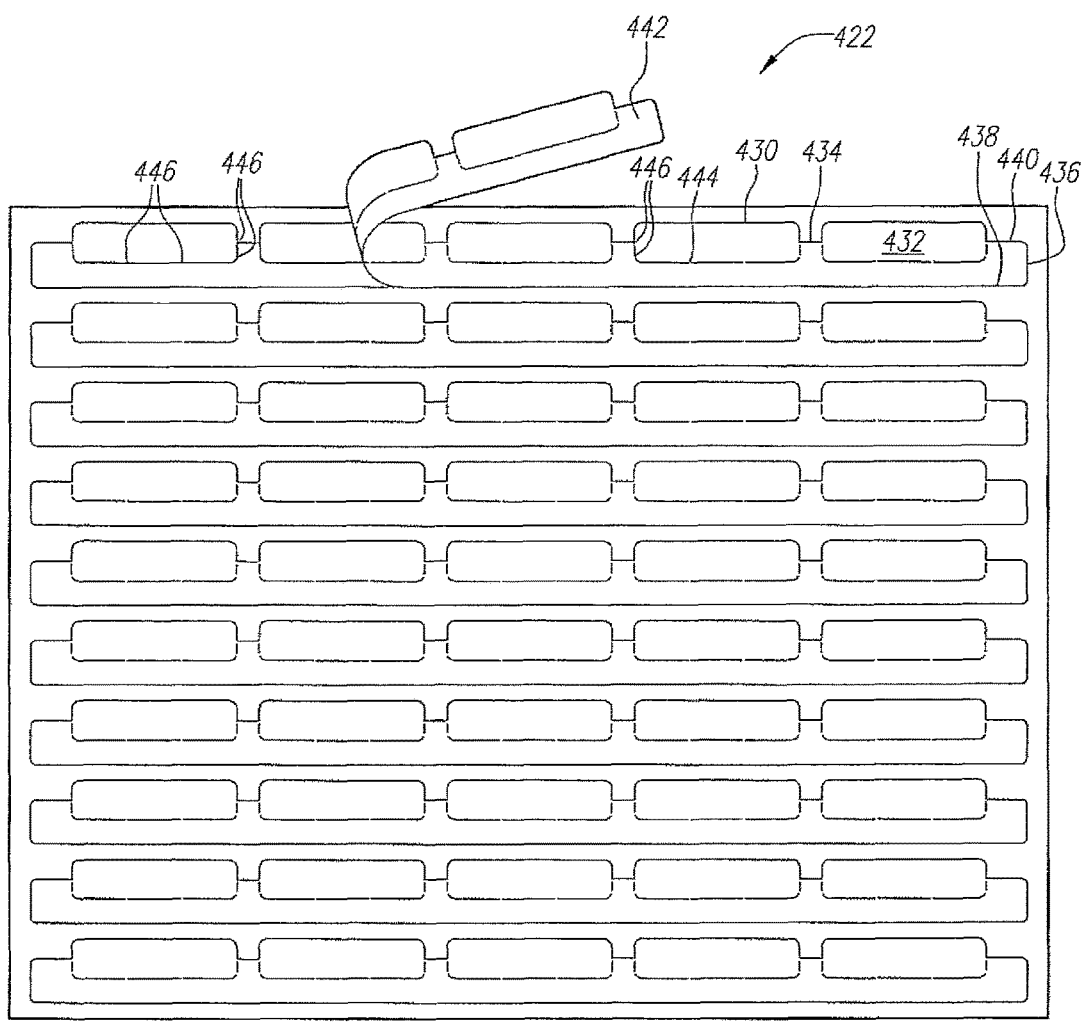
FIG. 43 is top plan view of the label sheet assembly illustrating a carrier strip and labels being removed according to yet another embodiment of the present invention.
Figure 44:
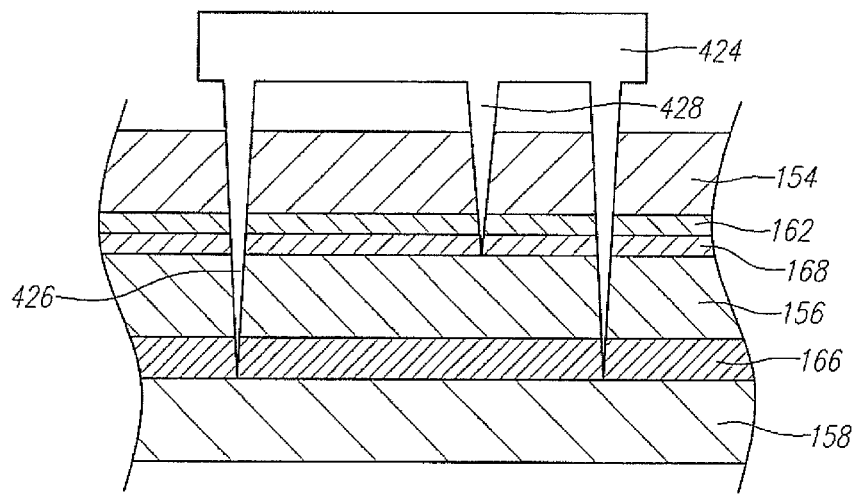
FIG. 44 is an enlarged sectional view of a laminate material being cut with a multi-step die according to an embodiment of the present invention.

The embodiment 422 shown in FIG. 43 is one that can be formed with all cuts made through the facestock sheet 154 of a laminate. In this embodiment, a multi-step die 424 is used to make the cut lines. A multi-step die is one that cuts to different depths in a single cut. Thus, as can be seen in FIG. 44, the cutting edge 426 cuts to a different depth than cutting edge 428. The top-most portion 430 of the labels 432, the cut lines 434 between the labels, and the side edges 436, the end edges 440, and the bottom edge 438 of the carrier strip 442 are made with the first step 426 of the multi-step die cutting through the facestock sheet and the carrier sheet. The second step 428 of the multi-step die cuts the bottom-most portion 444 of the label. However, so that the labels are removed with the carrier strip, several small ties 446 are provided in the cut forming the bottom-most portion of the label. As the carrier strip is removed from the label sheet assembly, the ties joining the label to the facestock sheet portion of the carrier strip facilitate the label being peeled away from the underlying carrier sheet portion. The ties will be weak enough, though, to break when the labels are applied to the final substrate.

Figure 45:
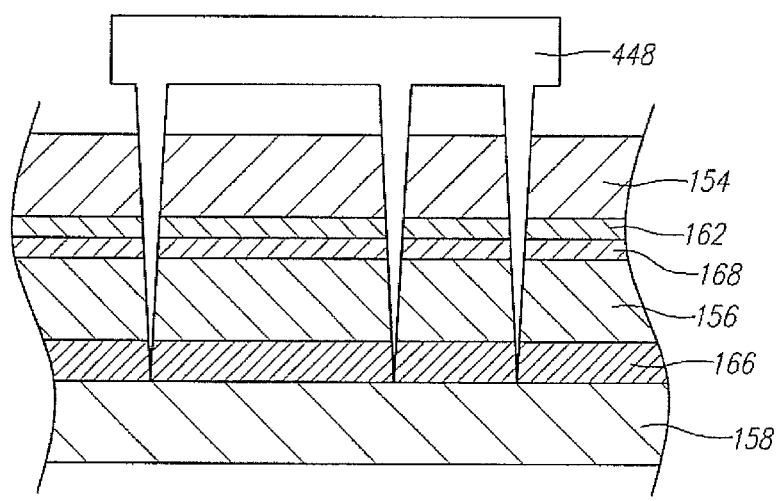
FIG. 45 is an enlarged sectional view of a laminate material being cut with a single-step die according to an embodiment of the present invention.

An alternative embodiment to that of FIG. 43 would make use of a single-step die 448 as shown in FIG. 45. All cuts in the label sheet assembly are made through the facestock sheet 154 and the carrier sheet 156. In this embodiment, the ties 446 that join the labels 432 to the facestock sheet portion of the carrier strip 442 will overlie and cover ties in the carrier sheet since both sets of ties are made by the same die cut. Proper choice of dry-tack adhesive 166 joining the carrier sheet to the liner sheet 158 is important. The adhesion of the carrier sheet to the liner sheet must be strong enough to break the carrier sheet ties when the carrier strip is removed, yet weak enough to allow removal of the carrier strip from the label sheet assembly. Additionally, the adhesion of the pressure sensitive adhesive 162 to the release coating 168 on the carrier sheet must be weak enough to allow the labels to be removed with the carrier strip without the facestock sheet ties breaking, yet not so weak that the label sheet assembly 422 cannot pass through a printer or copier without the labels separating from the label sheet assembly.

Figure 46:
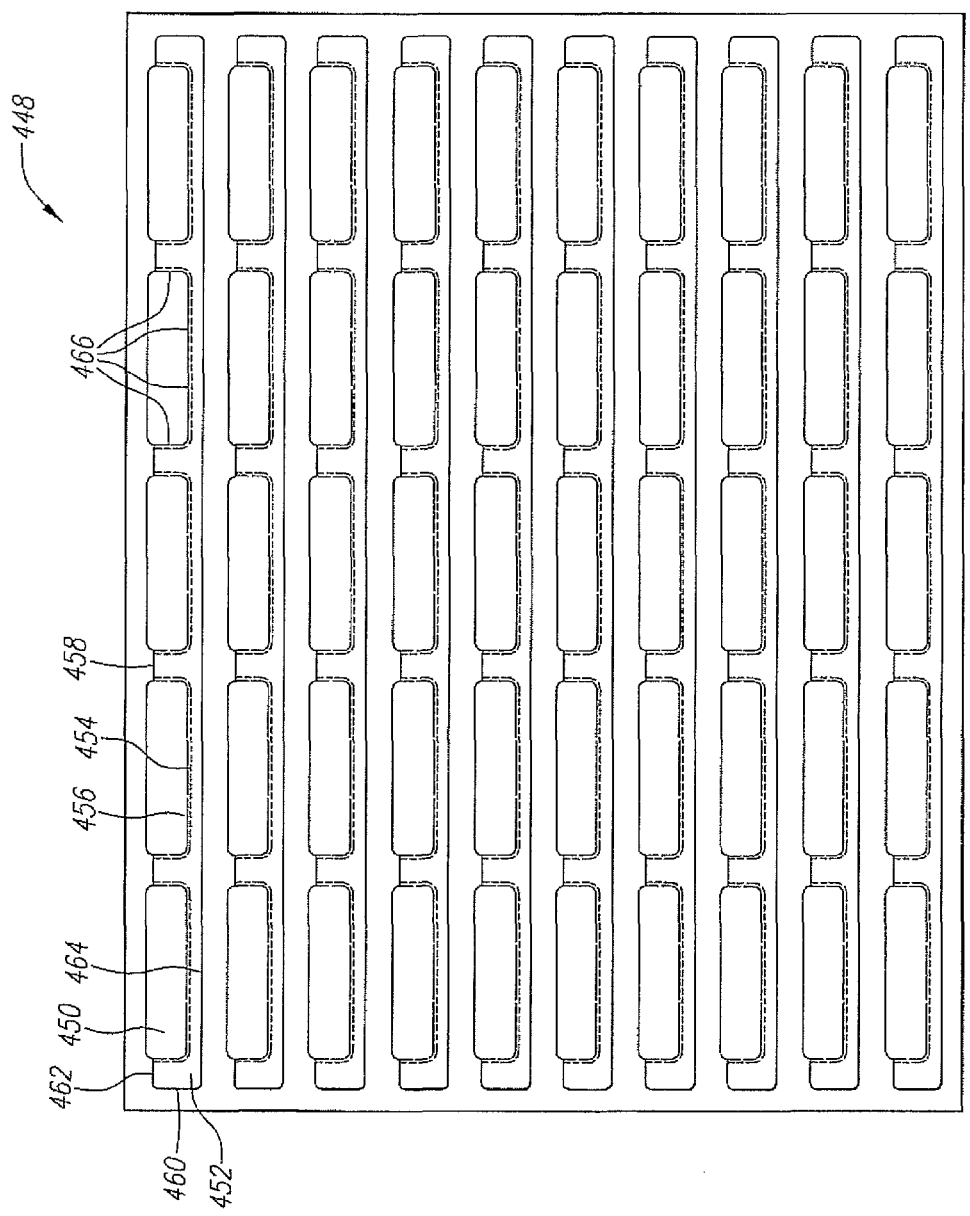
FIG. 46 is top plan view of a label sheet assembly according to another embodiment of the present invention.

Another embodiment 448 is shown in FIG. 46. This embodiment is similar to that shown in FIG. 42, except the labels 450 cut in the facestock sheet 154 do not overlay any of the carrier strip 452. The cuts 454 in the carrier strip of the embodiment of FIG. 42 that would underlie the label are now located outside the cuts 456 that form the label in this embodiment. As in the embodiment of FIG. 42, the top edge 458 of the carrier strip is cut in the carrier sheet 156. The remaining cut lines that form the side edges 460, end edges 462, and the bottom edge 464 of the carrier strip can be cut through the facestock sheet and through the carrier sheet. The cuts in the facestock sheet that form the label include ties 466 between the facestock sheet portion of the carrier strip and the label. The ties hold the label in place on the carrier strip when the carrier strip is removed from the label sheet assembly 448 prior to applying the labels to a substrate.

Figure 36:
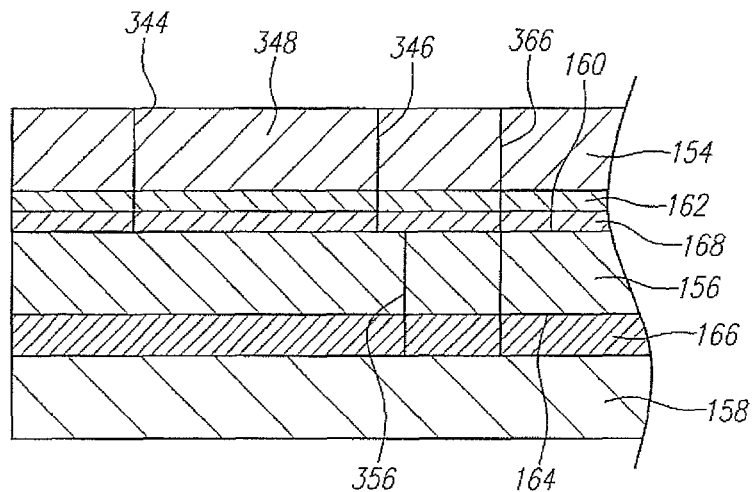
FIG. 36 is an enlarged sectional view of the label sheet assembly taken along line 36-36 of FIG. 35 according to an embodiment of the present invention.
Figure 37:
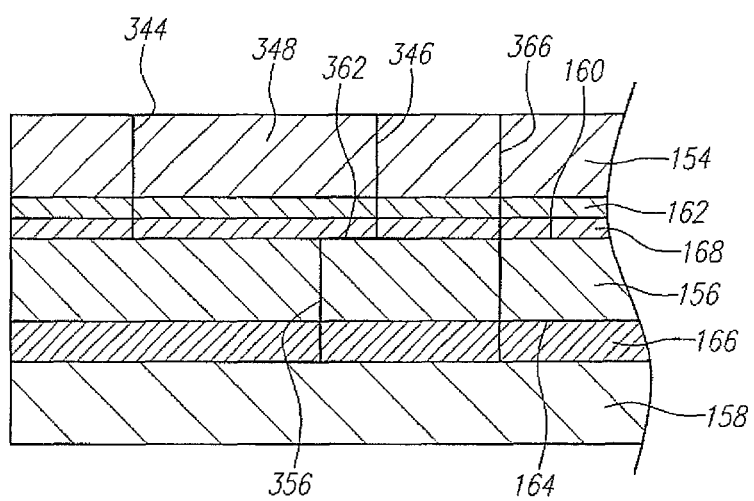
FIG. 37 is an enlarged sectional view of the label sheet assembly taken along line 37-37 of FIG. 35 according to an embodiment of the present invention.
Figure 38:
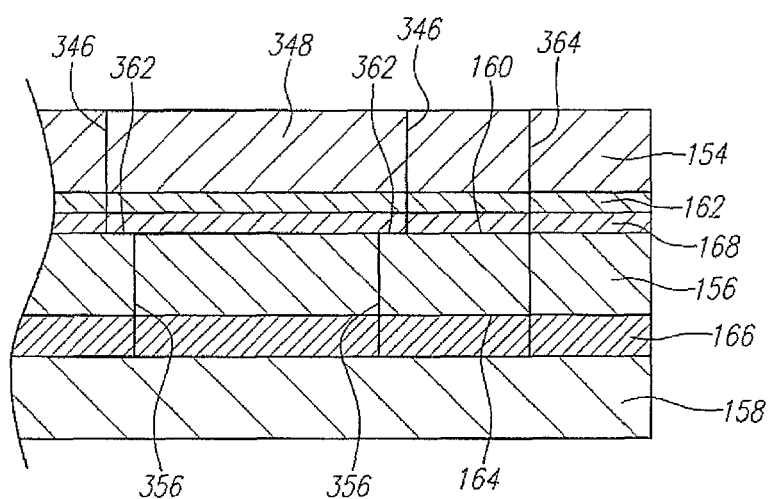
FIG. 38 is an enlarged sectional view of the label sheet assembly taken along line 38-38 of FIG. 35 according to an embodiment of the present invention.

Advantageously, in all the label sheet assembly embodiments discussed in FIGS. 35, 39, 42, 43, and 46, the thickness of the assembly is uniform, as seen in FIGS. 36-38. Any location on the label sheet assembly, with the exception of any cut lines, includes the facestock sheet 154, the carrier sheet 156, and the liner sheet 158, as well as the dry-tack 166 and pressure sensitive 162 adhesives. In products with uneven thickness, print quality can suffer. Uniform thickness is particularly advantageous for labels designed to be printed, where any variation in thickness can affect the quality of indicia formed as a result of printing. For example, indicia deposited by a laser printer in thicker areas of a label on a label sheet assembly may not fuse as effectively as indicia deposited in thinner areas, resulting in variable print quality. Unevenness in the thickness of the label sheet assembly can also affect the speed with which the label sheet assembly passes through a printer or copier. Variations in speed during the formation of indicia can affect the quality of the printed indicia as well.

Figure 47:
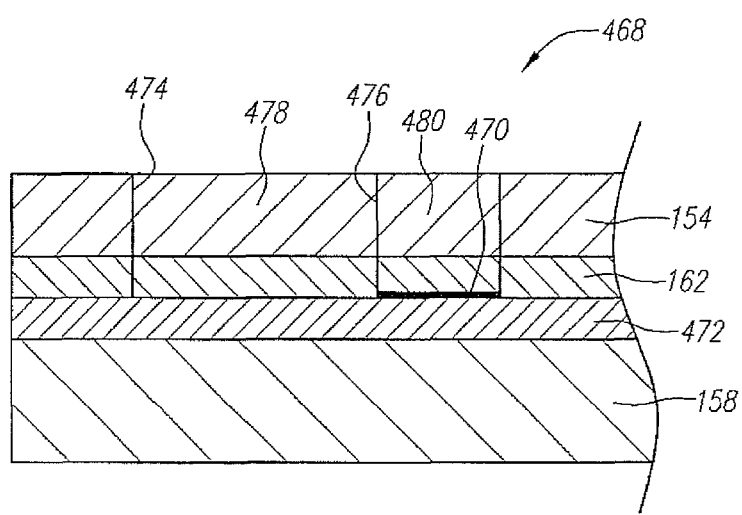
FIG. 47 is an enlarged sectional view label sheet assembly according to an embodiment of the present invention.
Figure 48:
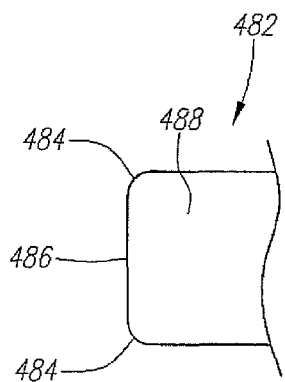
FIG. 48 is top plan view of a portion of a label according to an embodiment of the present invention.
Figure 49:
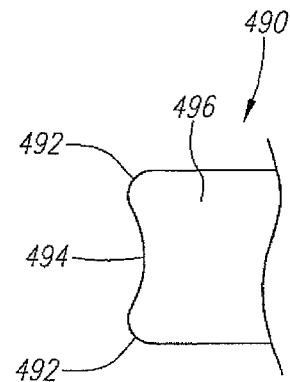
FIG. 49 is top plan view of a portion of a label according to another embodiment of the present invention.
Figure 50:
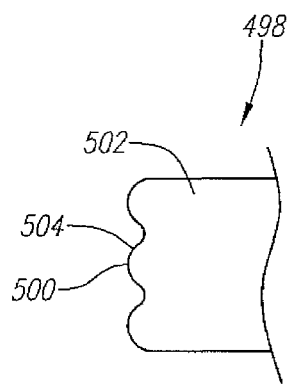
FIG. 50 is top plan view of a portion of a label according to yet another embodiment of the present invention.
Figure 51:
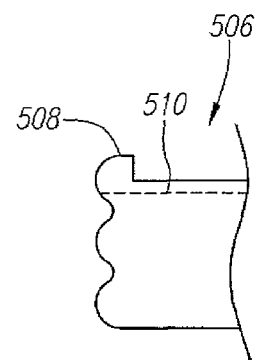
FIG. 51 is top plan view of a portion of a label according to yet another embodiment of the present invention.

The embodiment 468 shown in FIG. 47 includes a discontinuous carrier sheet 470 that can be printed onto a liner sheet 158, however the carrier sheet is very thin and does not appreciably affect the thickness of the label sheet assembly 468. In this embodiment, a non-adhesive coating 470 is applied to a liner sheet that includes a silicone release layer 472. The non-adhesive coating is applied in the shape any of the carrier strips as previously described and shown. The facestock sheet 154 is laminated to the liner sheet and the non-adhesive coating with a pressure sensitive adhesive 162, resulting in an essentially uniformly thick laminate. Cut lines 474 are made through the facestock sheet to form labels 478. Cut lines 476 are made through the facestock sheet and the non-adhesive coating to form the carrier strip 480. Removal of the carrier strip results in a non-tacky handle suitable for manipulating attached labels onto a substrate. In alternative embodiments, the cut lines can be made through only the facestock sheet. Removal of the carrier strip can result in small areas of the carrier strip being tacky.

FIGS. 48-51 show various embodiments suitable for use as side edges of a carrier strip. The embodiment 482 shown in FIG. 48 simply has rounded corners 484 at the side edge 486 of the carrier strip 488. The embodiment 490 shown in FIG. 49 had the rounded corners 492 at the side edge 494 accentuated by curving the end cut inward. By accentuating the corners, the carrier strip 496 can be more easily grasped for removal from the liner sheet 158. The embodiment 498 of FIG. 50 includes a wavy cut at the side edge 500 of the carrier strip 502. The wavy cut creates a third corner 504 in the middle of the side edge to further facilitate removal of the carrier strip. The embodiment 506 shown in FIG. 51 includes the top edge 508 of the facestock sheet portion and the top edge 510 of the carrier sheet portion of the carrier strip not being coincident.

A method 512 of forming the label assembly sheets is depicted in FIG. 52. A liner sheet material 158, a carrier sheet material 156, and a facestock sheet material 154 are provided at step 514, usually in roll form. The carrier sheet material and the liner sheet material are unwound and laminated at step 516 together with a dry-tack adhesive 166, and the adhesive is cured or dried to make it non-tacky. Cut lines are then formed at step 518 through the carrier sheet material but not through the liner sheet material. The cuts may penetrate through the adhesive and into the liner material, or may stop short of the liner material or the adhesive. Separately, the facestock sheet material is unwound and cut lines are formed at step 520 through the facestock sheet material. The cut facestock sheet material is laminated at step 522 to the cut carrier material with pressure sensitive adhesive 162. The laminate is sheeted at step 524 into sheets that include a liner sheet, carrier sheet, and a facestock sheet.

An alternative method 526 includes providing rolls of liner sheet material 158, carrier sheet material 156, and facestock sheet material 154 at step 528. As shown in FIG. 53, the facestock sheet material and carrier sheet material are unwound and laminated at step 530 together with pressure sensitive adhesive 162. Cut lines are formed at step 532 through the facestock sheet material but not through the carrier sheet material. Cut lines are formed at step 534 through the carrier sheet material but not the facestock sheet material. The cut carrier sheet material, along with the attached cut facestock sheet material, is laminated at step 536 to the liner sheet material with dry-tack adhesive 166. The laminate is sheeted at step 538 into sheets that include a liner sheet, carrier sheet, and a facestock sheet. In some methods, cut lines that form edges of the carrier strip are aligned and coincident, e.g., see 420 in FIG. 42. In these alternative embodiments, the coincident cut lines can be formed by cutting through both the carrier sheet material and the facestock sheet material. The cut lines can be formed from whichever side is convenient.

Figures 54, 55:
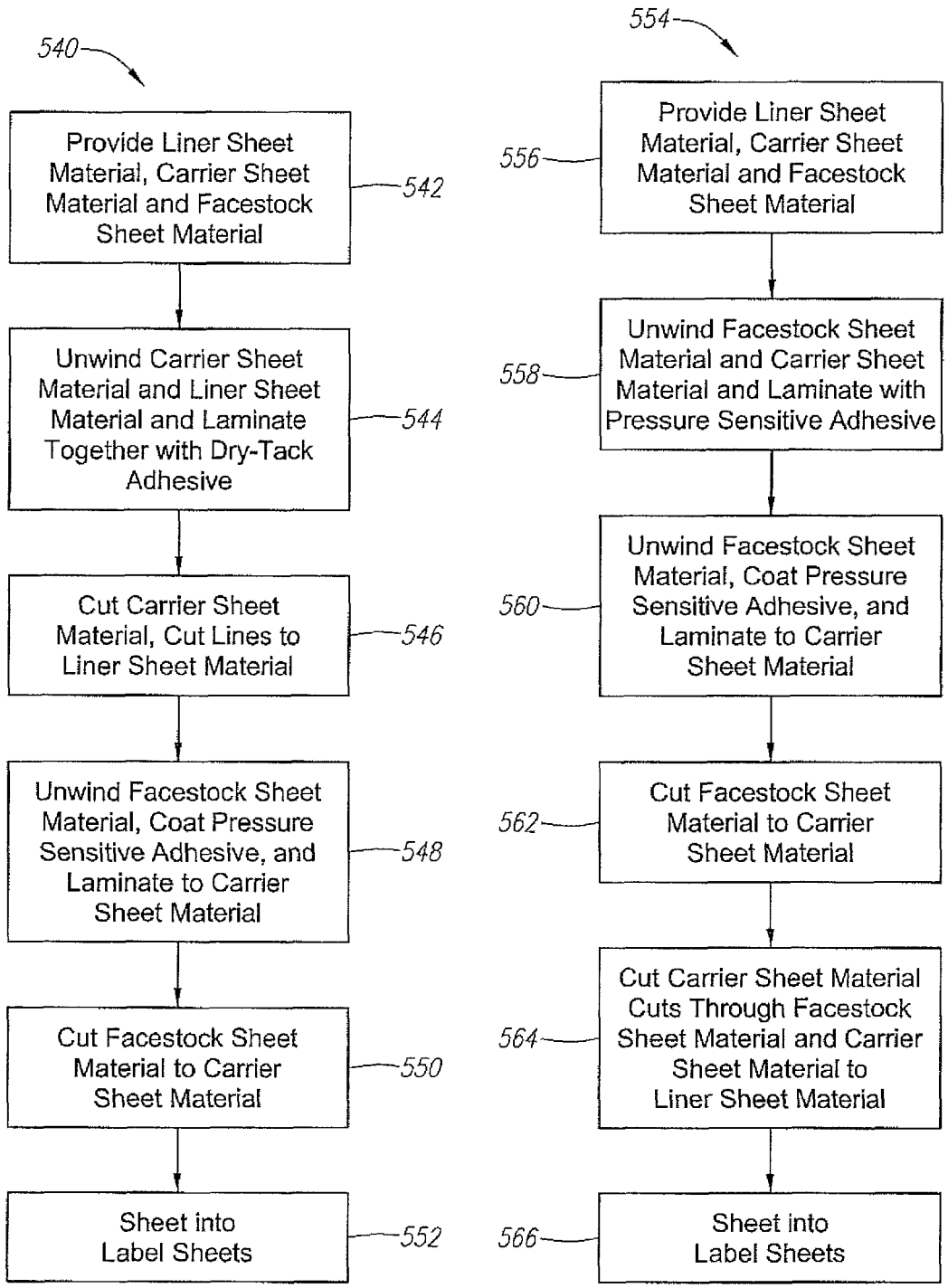
FIG. 54 is a flowchart of yet another example method to produce a label sheet assembly according to the invention.
FIG. 55 is a flowchart of yet another example method to produce a label sheet assembly according to the invention.

In yet another alternative method 540, rolls of liner sheet material 158, carrier sheet material 156, and facestock sheet material 154 are provided at step 542 as shown in FIG. 54. The carrier sheet material is laminated at step 544 to the liner sheet material with dry-tack adhesive 166. Cut lines are made at step 546 through the carrier sheet material but not through the liner sheet material. The facestock sheet material is then laminated at step 548 to the carrier sheet material with pressure sensitive adhesive 162. Cut lines are then formed at step 550 through the facestock sheet material, but not through the carrier sheet material. In some areas, the facestock sheet material cut lines are aligned and coincident with the carrier sheet material cut lines, giving the appearance of being cut through both the facestock sheet material and the carrier sheet material. The label sheet assemblies are then sheeted at step 552 into individual label sheet assemblies.

Another alternative method 554 is shown in FIG. 55. Liner sheet material 158, carrier sheet material 156, and facestock sheet material 154 is provided at step 556. The carrier sheet material is laminated at step 558 to the liner sheet material using a dry-tack adhesive 166 on one side, and laminated at step 560 to the facestock sheet material using a pressure sensitive adhesive 162 on the other side. Cut lines are formed at step 562 through the facestock sheet material but not through the carrier sheet material. Other cut lines are formed at step 564 through the facestock sheet material and the carrier sheet material, but not through the liner sheet material. In an alternative method, a multi-level die 424, as shown in FIG. 44, is used to form the cut lines through the facestock sheet material, and through the facestock sheet material and the carrier sheet material at the same time. After the facestock sheet material and carrier sheet material cuts are made, the label sheet assembly is sheeted at step 566 into sheets including the liner sheet, the carrier sheet, and the facestock sheet.

Utilizing the above methods of making a label sheet assembly, it is possible to form any number of sheet configurations to include labels for staggered tabs on a set of index dividers, folders, or the like. In addition, this technology is not limited to desktop printable sheets or to sheets at all, as it could be utilized to produce fan folded or roll products with unique characteristics as well. Furthermore, the invention is not limited to index tab labels, but may include amongst other things address labels, or labels having a shape other than the illustrated rectangular shape. In addition, it should be appreciated that although all the cut lines in the various sheet assemblies are shown as being formed orthogonal to the edges of the sheet assembly, the cuts may be formed in a manner that is not orthogonal to the edges of the sheet assembly.

Figure 57:
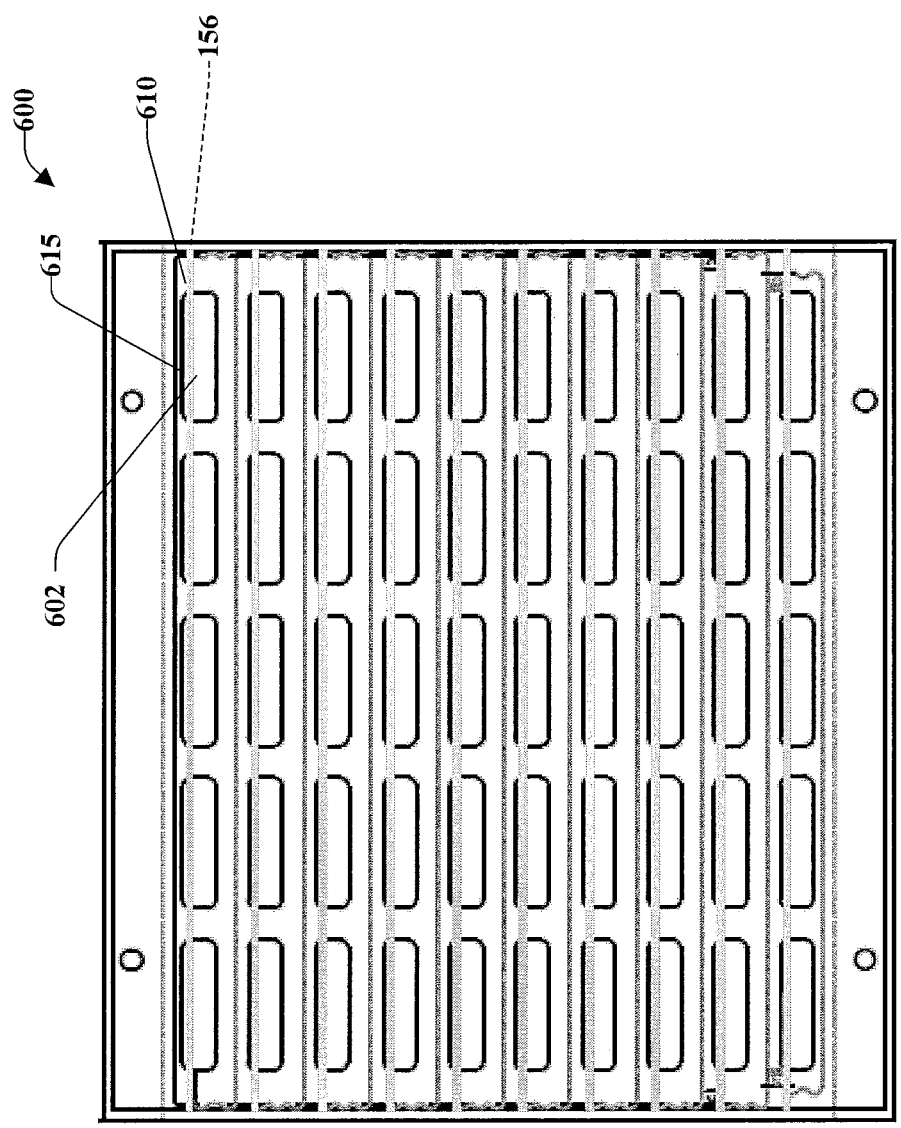
FIG. 57 is a top plan view of the label sheet assembly illustrating in accordance with another embodiment of the present invention.
Figure 58:
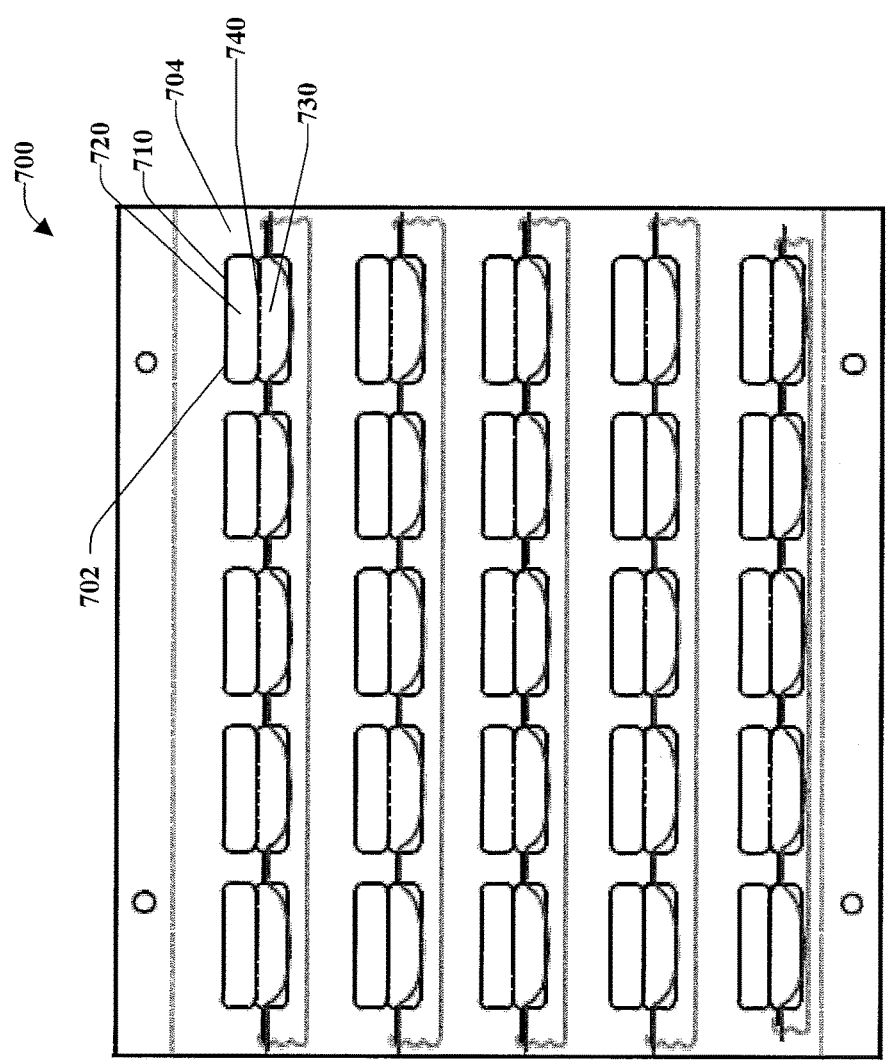
FIG. 58 is a top plan view of the label sheet assembly illustrating in accordance with another embodiment of the present invention.
Figure 59:
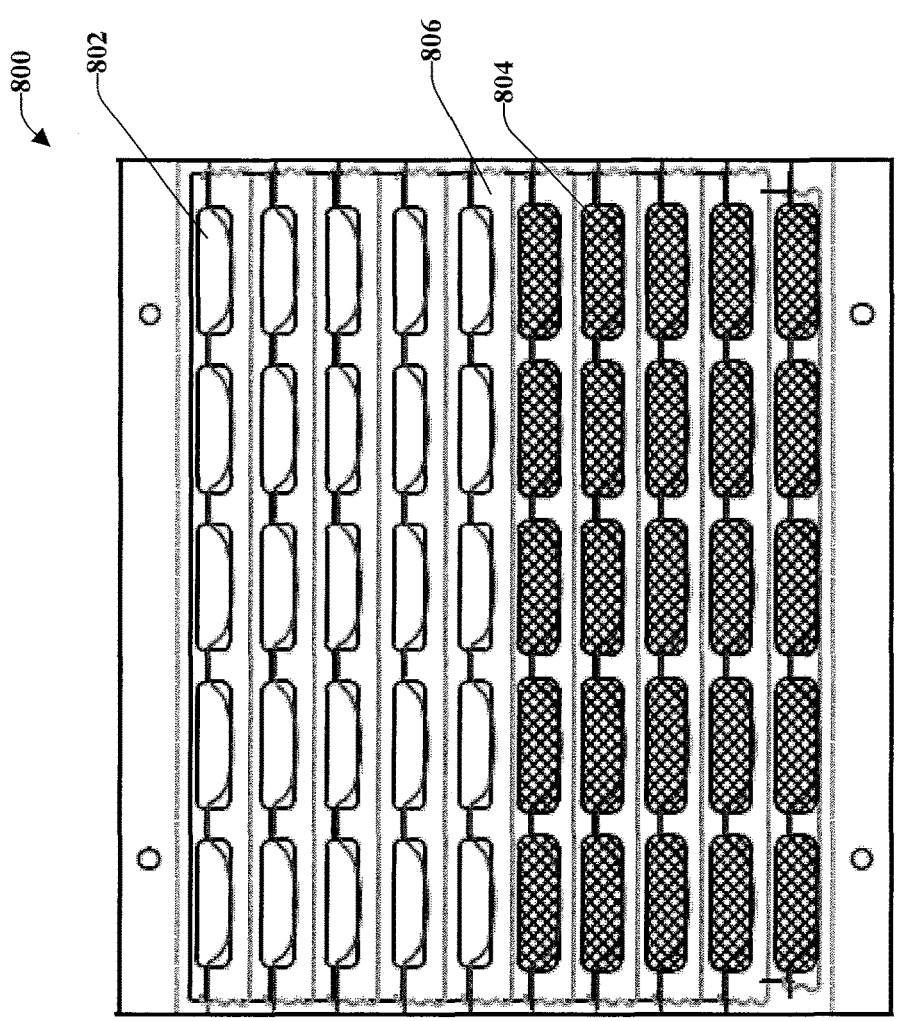
FIG. 59 is a top plan view of the label sheet assembly illustrating in accordance with another embodiment of the present invention.

An additional number of exemplary carrier sheet cut line patterns and facestock sheet cut line patterns have been provided in FIGS. 57, 58, and 59. These and other similarly-cut carrier sheets and facestock sheets can be combined to provide label sheet assemblies of the present invention. Several illustrative embodiments are now shown and described.

One embodiment 600 of a label sheet assembly is shown in FIG. 57. FIG. 57 shows a progressive easy peel feature that allows consumers to use this pop-up feature to apply all aligned labels 602 at once onto a set of divider tabs. In particular, the carrier sheet material 156 may include a plurality of cuts 610 wherein each cut underlies a portion of the aligned labels 602. In particular, this embodiment 600 may incorporate various other features as described in the embodiments above but also include the cuts 610 in the carrier sheet 156. The cuts 610 may allow the carrier sheet material 156 to be easily foldable and/or removable so the carrier strip may be removable to allow for an adhesive portion 615 of the aligned labels 602 to be exposed in an aligned manner along the cuts 610.

Another embodiment 700 of a label sheet assembly is shown in FIG. 58. FIG. 58 shows a particular cutline pattern 710 within the facestock 704 in which the labels 702 are each formed into a foldable butterfly pattern. The labels 702 including an upper portion 720 and a lower portion 730 attached along a fold line 740. The fold line 740 may be a cut line that includes a series of cuts and ties or may be a partially cut line to allow for ease of folding. This embodiment allows for the labels 702 to be detached from the carrier strip to be adhered to divider tabs to cover a front side and rear side of the tabs. Once either the upper portion 720 or lower portion 730 is adhered to the tab, the other of the upper portion 720 or lower portion 730 may be folded over the tab to adhere to the opposite side thereof. In particular, this embodiment 700 may incorporate various other features as described in the embodiments above but also include the butterfly cut pattern of the labels.

In another embodiment 800 of a label sheet assembly is shown in FIG. 59. FIG. 59 shows a particular cutline pattern within the facestock 806 that defines a plurality of first size labels 802 and a plurality of second sized labels 804. The first sized labels 802 may be generally smaller than the second size labels 804. Notably, the second sized labels 804 may be oversized labels that may be configured to fill otherwise unfilled portions of the divider tabs with color or to protect printed text/image thereon. In one embodiment, the first size labels 802 may be white in color to receive written or printed text or graphic while the second size labels 804 may be transparent and configured to be placed over the first size label on the divider tab to provide a layer of protection thereon. In particular, this embodiment 800 may incorporate various other features as described in the embodiments above but also include the oversized labels.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A label sheet assembly, comprising:
   a carrier sheet having first and second sides;
   a facestock sheet releasably coupled to the first side of the carrier sheet with a layer of pressure sensitive adhesive;
   a liner sheet releasably coupled to the second side of the carrier sheet with a layer of adhesive;
   cut lines in the facestock sheet defining a set of labels;

cut lines in the facestock sheet defining at least a portion of a carrier strip; and the carrier strip including a portion of the carrier sheet and a portion of the facestock sheet;

wherein:

the labels are formed into a foldable butterfly pattern that includes an upper portion and a lower portion attached along a fold line;

the carrier strip and the set of labels are configured to be removed from the label sheet assembly with the set of labels attached to the carrier strip; and the label sheet assembly is configured to have a uniform thickness in an area including the carrier strip and labels before removal of the carrier strip and the set of labels.

2. The label sheet assembly of claim 1, wherein the uniform thickness is approximately 4.2 mils to approximately 12.6 mils.

3. The label sheet assembly of claim 1, wherein the uniform thickness is approximately 6 mils to approximately 8.1 mils.

4. The label sheet assembly of claim 1, wherein the carrier sheet is a non-adhesive coating.

5. The label sheet assembly of claim 4, wherein the carrier sheet is pattern coated.

6. The label sheet assembly of claim 1, wherein:
(i) the cut lines in the facestock sheet defining the set of labels define a first set of labels;
(ii) the cut lines in the facestock sheet defining a carrier strip define a first carrier strip;
(iii) the label sheet assembly further comprises:
(a) additional cut lines in the facestock sheet defining a second set of labels;
(b) additional cut lines in the facestock sheet defining a second carrier strip.

7. The label sheet of claim 1, further comprising: additional cuts in the carrier sheet;
wherein:
(i) the cuts and additional cuts define a backing strip,
(ii) the backing strip is configured to be removed with the carrier strip and the set of labels, and
(iii) the backing strip is configured to be removed from the carrier strip and the set of labels such that at least a portion of the set of labels have an exposed layer of pressure sensitive adhesive.

8. The label sheet assembly of claim 1, wherein at least a portion of the labels have an exposed layer of pressure sensitive adhesive when the carrier strip and the labels are removed from the label sheet assembly.

9. The label sheet assembly of claim 1, wherein the liner sheet is free of cuts.

10. The label sheet assembly of claim 1, wherein the adhesive layer coupling the liner sheet and the second side of the carrier sheet is a dry-tack adhesive.

11. The label sheet assembly of claim 1, wherein the adhesive layer coupling the liner sheet and the second side of the carrier sheet is a heat seal layer.

12. The label sheet assembly of claim 1, wherein the adhesive layer coupling the liner sheet and the second side of the carrier sheet is an ultraremovable adhesive.

13. The label sheet assembly of claim 1, wherein the carrier sheet includes a release layer.

14. The label sheet assembly of claim 1, where in the liner sheet includes a release layer.

15. The label sheet assembly of claim 1, wherein the labels are attached to the carrier strip with ties.

16. The label sheet assembly of claim 1, the cut lines in the facestock further define a plurality of first size labels and a plurality of second size labels.

17. The label assembly of claim 16, the plurality of second size labels are different from plurality of first size labels in size.

18. The label assembly of claim 16, the plurality of second size labels are different from plurality of first size labels in color.

19. A method for making a label sheet assembly, the method comprising:
(i) providing facestock sheet material, carrier sheet material, and liner sheet material;
(ii) coupling the facestock sheet material to a first side of the carrier sheet material with a pressure sensitive adhesive;
(iii) coupling the liner sheet material to a second side of the carrier sheet material with an adhesive;
(iv) cutting lines in the facestock sheet material to define a set of labels; and
(v) cutting lines in the facestock sheet material to define at least a portion of a carrier strip;
wherein:
(i) the labels are formed into a foldable butterfly pattern that includes an upper portion and a lower portion attached along a fold line;
(ii) the carrier strip includes a portion of the carrier sheet material and a portion of the facestock sheet material,
(iii) the carrier strip and the labels are configured to be removed from the label sheet assembly with the labels attached to the carrier strip, and
(iv) the label sheet assembly is configured to have a uniform thickness in an area including the carrier strip and the set of labels before removal of the carrier strip and the set of labels.

20. The method of claim 19, the method further comprising:
sheeting a laminate material;
wherein the step of coupling the facestock sheet material to a first side of the carrier sheet material with a pressure sensitive adhesive and the step of coupling the liner sheet material to a second side of the carrier sheet material with an adhesive form the laminate material.

21. The method of claim 20, wherein the laminate material includes the facestock sheet material cuts.

22. The method of claim 19, wherein the uniform thickness is approximately 6 mils to approximately 8.1 mils.

* * * * *